US012768397B2

(12) United States Patent
Iida et al.

(10) Patent No.: US 12,768,397 B2
(45) Date of Patent: Oct. 20, 2026

(54) THRUST FOIL BEARING

(71) Applicant: IHI Corporation, Tokyo (JP)

(72) Inventors: Tsutomu Iida, Tokyo (JP); Masahiro Nakajima, Tokyo (JP); Shigekazu Aoyama, Tokyo (JP)

( * ) Notice: Subject to any disclaimer, the term of this patent is extended or adjusted under 35 U.S.C. 154(b) by 13 days.

(21) Appl. No.: 18/887,174

(22) Filed: Sep. 17, 2024

(65) Prior Publication Data

US 2025/0012317 A1 Jan. 9, 2025

Related U.S. Application Data

(63) Continuation of application No. PCT/JP2022/048367, filed on Dec. 27, 2022.

(30) Foreign Application Priority Data

Mar. 23, 2022 (JP) ................................ 2022-046283

(51) Int. Cl.
*F16C 17/04* (2006.01)

(52) U.S. Cl.
CPC ................................ *F16C 17/042* (2013.01)

(58) Field of Classification Search
CPC ................................ F16C 17/042
See application file for complete search history.

(56) References Cited

U.S. PATENT DOCUMENTS 4,277,112 A * 7/1981 Heshmat .............. F16C 17/042
384/124
5,911,511 A 6/1999 Saville
12,345,293 B2 * 7/2025 Iida ........................ F16C 27/02
2004/0179759 A1 9/2004 Katou et al.
2011/0103725 A1 5/2011 Omori
2014/0169707 A1 6/2014 Yoshino
2015/0219147 A1 8/2015 Furuno
2016/0195129 A1 7/2016 Omori
2021/0341013 A1 11/2021 Omori
2023/0366429 A1 11/2023 Iida et al.

FOREIGN PATENT DOCUMENTS

CN 111120503 5/2020
EP 4219965 8/2023
JP S61-140217 8/1986
(Continued)

OTHER PUBLICATIONS

Translation of WO2022065375 obtained Feb. 9, 2026.*
(Continued)

*Primary Examiner* — James Pilkington
(74) *Attorney, Agent, or Firm* — SHIPWAY IP

(57) ABSTRACT

A thrust foil bearing includes: a base plate including an insertion hole through which a rotating shaft is inserted and a support surface; a plurality of top foil pieces supported by the support surface; a stepped member that is placed on the support surface, is formed as a separate body from the base plate, and includes a plurality of stepped support portions including a plurality of stepped surfaces; and a plurality of bump foil pieces that are disposed between the top foil pieces and the base plate, are respectively disposed on the plurality of stepped support portions, and include valley portions in contact with the stepped surfaces.

23 Claims, 15 Drawing Sheets

(56) References Cited

FOREIGN PATENT DOCUMENTS

| | | |
|---|---|---|
| JP | 2003-232340 | 8/2003 |
| JP | 2004-270904 | 9/2004 |
| JP | 2006-057652 | 3/2006 |
| JP | 2009-299748 | 12/2009 |
| JP | 2015-059629 | 3/2015 |
| JP | 5766562 | 8/2015 |
| JP | 6065917 | 1/2017 |
| JP | 2017-180592 | 10/2017 |
| JP | 2020-115021 | 7/2020 |
| WO | 2014/061698 | 4/2014 |
| WO | 2015/028051 | 3/2015 |
| WO | 2020/149200 | 7/2020 |
| WO | 2022/065375 | 3/2022 |

OTHER PUBLICATIONS

Extended Search Report in corresponding European Application No. 22933704.3, dated Dec. 17, 2025.
International Search Report dated Mar. 14, 2023 for PCT/JP2022/048367.
International Preliminary Report on Patentability with Written Opinion dated Oct. 3, 2024 for PCT/JP2022/048367.

* cited by examiner

THRUST FOIL BEARING

CROSS-REFERENCE TO RELATED APPLICATIONS

This application is a continuation application of PCT Application No. PCT/JP2022/048367, filed on Dec. 27, 2022, which claims the benefit of priority from Japanese Patent Application No. 2022-046283, filed on Mar. 23, 2022. The entire contents of the above listed PCT and priority applications are incorporated herein by reference.

BACKGROUND

The present disclosure relates to a thrust foil bearing.

Japanese Patent No. 6065917 discloses a thrust foil bearing used as a bearing for a high-speed rotating body. The thrust foil bearing disclosed in Patent Literature 1 is disposed to face a thrust collar provided on a rotating shaft. A bearing surface of the thrust foil bearing is formed of a flexible foil that is a thin plate made of metal. The thrust foil bearing has a foil structure to flexibly support the bearing surface. The rotating shaft may cause unintended movement due to vibrations and impacts. Unintentional movement of the rotating shaft, for example, can cause the thrust collar to move in an axial direction. In addition, the thrust collar may incline due to the unintentional movement of the rotating shaft. The thrust foil bearing can absorb the movement of the thrust collar caused by the movement of the rotating shaft.

The thrust foil bearing includes a plurality of top foil pieces and a plurality of bump foil pieces. The top foil piece is supported by the bump foil piece. As the thrust collar rotates, a lubricating fluid is introduced between the top foil piece and the thrust collar. The lubricating fluid forms a wedge-shaped fluid lubrication film between the top foil piece and the thrust collar. As a result of the formation of the fluid lubrication film, a load capacity of the thrust foil bearing is exhibited.

The load capacity of thrust foil bearings is influenced by a morphology of the fluid lubrication film. Therefore, a desired load capacity is exhibited generating a desired fluid lubrication film. A morphology of the desired fluid lubrication film is influenced by a shape of a gap between the top foil piece and the thrust collar. The wedge-shaped gap is formed by an inclined surface provided on the base plate.

For example, the inclined surface may be formed by cutting or the like. The inclined surface formed by cutting may not have an intended configuration due to processing errors or the like. In a case where the inclined surface does not have the intended configuration, the wedge-shaped gap also does not have the intended configuration. As a result, the load capacity of the thrust foil bearing may be less than a desired capacity.

The present disclosure describes a thrust foil bearing may be configured to exhibit a desired load capacity.

SUMMARY

A thrust foil bearing of the present disclosure includes: a base plate including an insertion hole through which a rotating shaft is inserted and a support surface; a plurality of top foil pieces supported by the support surface; a stepped member that is placed on the support surface, is formed as a separate body from the base plate, and includes a plurality of stepped support portions formed by a plurality of stepped surfaces; and a plurality of bump foil pieces that are disposed between the top foil pieces and the base plate, are respectively disposed on the plurality of stepped support portions, and include contact portions in contact with the stepped surfaces.

The thrust foil bearing of the present disclosure may be configured to exhibit a desired load capacity.

DETAILED DESCRIPTION

Figure 1:
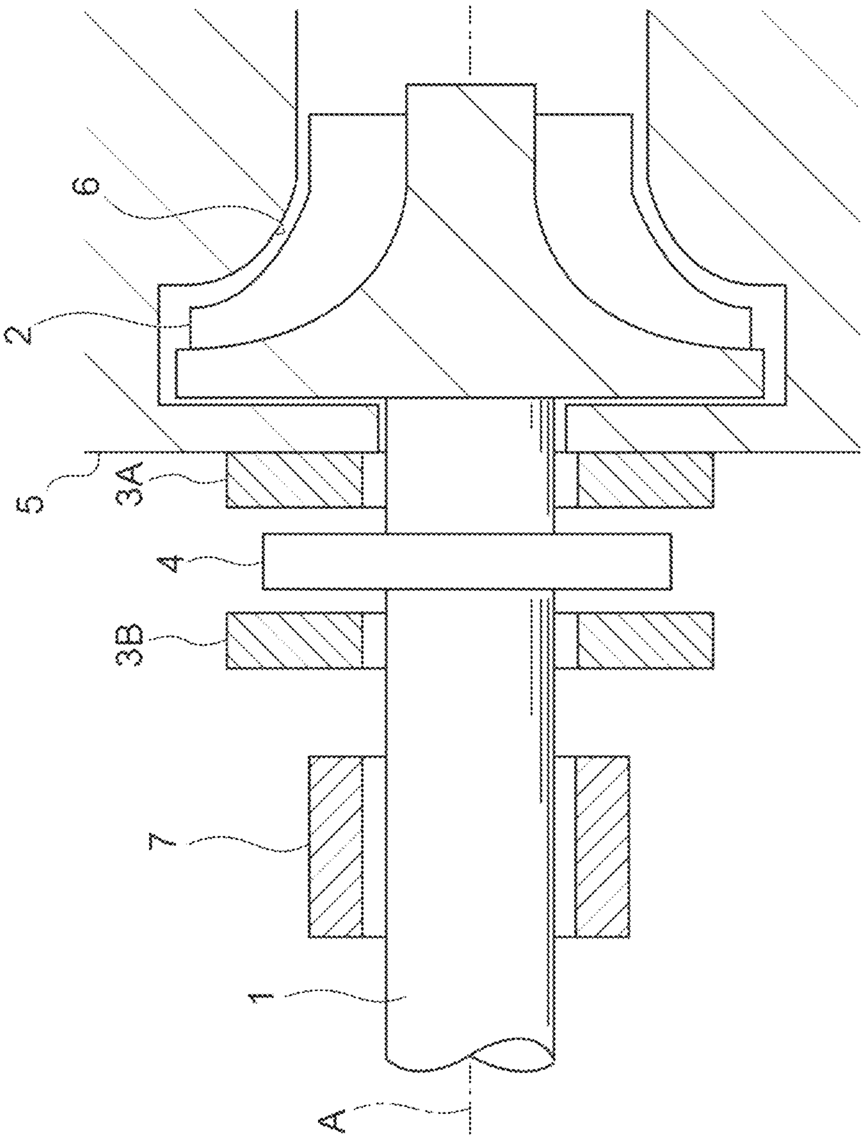
FIG. 1 is a side view showing an example of a turbomachine to which a thrust foil bearing of the present disclosure is applied.

In the following description, with reference to the drawings, the same reference numbers are assigned to the same components or to similar components having the same function, and overlapping description is omitted.

A thrust foil bearing of the present disclosure includes: a base plate including an insertion hole through which a rotating shaft is inserted and a support surface; a plurality of top foil pieces supported by the support surface; a stepped member that is placed on the support surface, is formed as a separate body from the base plate, and includes a plurality of stepped support portions formed by a plurality of stepped surfaces; and a plurality of bump foil pieces that are disposed between the top foil pieces and the base plate, are respectively disposed on the plurality of stepped support portions, and include contact portions in contact with the stepped surfaces.

The thrust foil bearing includes the stepped member that is a separate body from the base plate. According to this stepped member, deviations in step dimensions from the design values may be readily reduced. As a result, a decrease in load capacity due to the deviations in step dimensions is suppressed. Therefore, the thrust foil bearing may exhibit a desired load capacity.

The plurality of stepped support portions of the thrust foil bearing are provided to surround the insertion hole. According to such a configuration, the plurality of stepped support portions may be provided around the insertion hole.

A first plate member of the thrust foil bearing may include a first sandwiched portion including an arc-shaped outer circumferential edge, and the first support region provided between the first sandwiched portion and the insertion hole when viewed in a direction of an axis of the insertion hole. A second plate member may include a second sandwiched portion including an arc-shaped outer circumferential edge, and a second support region provided between the second sandwiched portion and the insertion hole when viewed in the direction of the axis of the insertion hole. The stepped support portion may be formed by stacking the first support region and the second support region. With such a configuration as well, the desired load capacity may be exhibited.

A shape of the second support region of the thrust foil bearing may be different from a shape of the first support region when viewed in the direction of the axis of the insertion hole. According to such a configuration, a virtual incline that supports the bump foil piece may be formed.

The first support region of the thrust foil bearing may include an inner circumferential edge extending to surround the insertion hole. The inner circumferential edge may include a first inner circumferential edge portion and a second inner circumferential edge portion. A distance from the axis of the insertion hole to the first inner circumferential edge portion may be different from a distance from the axis of the insertion hole to the second inner circumferential edge portion. With such a configuration as well, the desired load capacity may be exhibited.

A sandwiched portion of the thrust foil bearing may include a through hole through which a fastener for fastening the stepped member to the base plate is inserted. According to such a configuration, the stepped member may be fastened to the base plate.

The number of the through holes of the thrust foil bearing may be different from the number of the stepped support portions. With such a configuration as well, the stepped member may be fixed to the base plate.

FIG. 1 is a side view showing an example of a turbomachine to which the thrust foil bearing of the present disclosure is applied. An impeller 2 is attached to an end portion of a rotating shaft 1. A tip clearance 6 is present between the impeller 2 and a housing 5. The rotating shaft 1 is supported by thrust foil bearings 3A and 3B and a radial foil bearing 7.

The radial foil bearing 7 supports the rotating shaft 1 in a direction (radial direction) perpendicular to an axis A. The thrust foil bearings 3A and 3B support the rotating shaft 1 in a direction (thrust direction) along the axis A. A disk-shaped thrust collar 4 is attached to the rotating shaft 1. The thrust collar 4 is interposed between the thrust foil bearings 3A and 3B.

Figure 2:
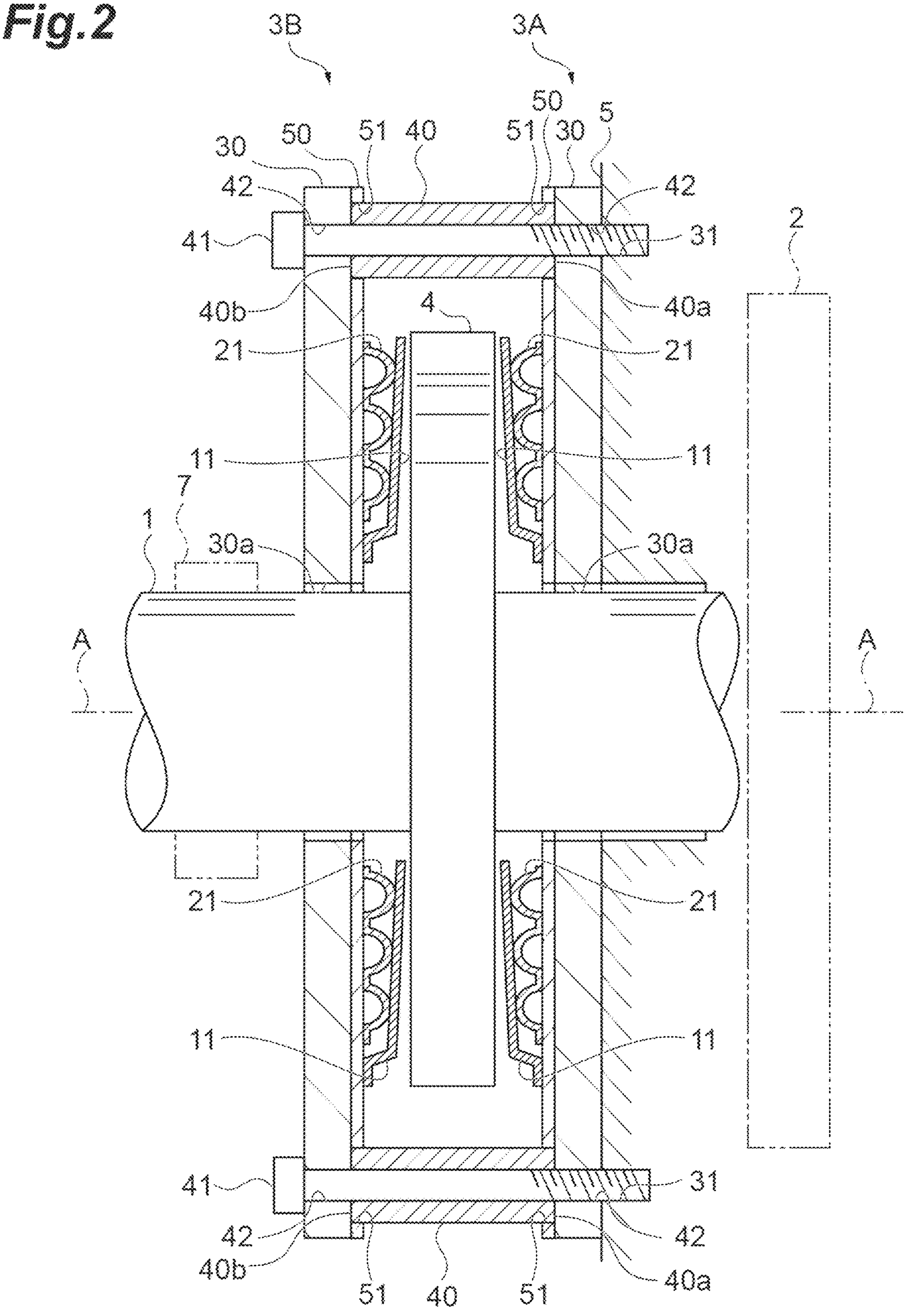
FIG. 2 is a cross-sectional view of the thrust foil bearing of the present disclosure.

As shown in FIG. 2, the thrust foil bearing 3A is disposed between the thrust collar 4 and the impeller 2. The thrust foil bearing 3B is disposed between the thrust collar 4 and the radial foil bearing 7. A configuration of the thrust foil bearing 3A is the same as a configuration of the thrust foil bearing 3B. The thrust foil bearings 3A and 3B each include a plurality of top foil pieces 11, a plurality of bump foil pieces 21, a base plate 30, and a stepped member 50.

Cylindrical bearing spacers 40 are disposed between the base plate 30 of the thrust foil bearing 3A and the base plate 30 of the thrust foil bearing 3B. The base plate 30 of the thrust foil bearing 3A is connected to the thrust foil bearing 3B by fastening bolts 41. Through holes 42 through which the fastening bolts 41 are inserted are formed in an outer circumferential portion of the base plate 30. A tip of the fastening bolt 41 is screwed into a screw hole 31 of the housing 5. The base plate 30 of the thrust foil bearing 3A is in contact with the housing 5 by being fastened with the fastening bolts 41.

Hereinafter, the thrust foil bearing 3A will be described in detail with reference to FIGS. 3 to 10. The configuration of the thrust foil bearing 3B is the same as the configuration of the thrust foil bearing 3A. Therefore, detailed description of the thrust foil bearing 3B will be omitted.

In the following description, a positional relationship of each member will be described with respect to an insertion hole 30*a* provided in the base plate 30 as a reference. For example, an "axial direction" is a direction in which the axis A of the insertion hole 30*a* extends. The "axial direction" is a direction in which the rotating shaft 1 is inserted. In addition, the "axial direction" is a direction in which the rotating shaft 1 extends. A "radial direction" is a direction along a diameter of the insertion hole 30*a*. The "radial direction" is a direction that intersects the axis A of the insertion hole 30*a* when viewed in an axis A direction. A "circumferential direction" is a direction along an inner circumferential surface of the insertion hole 30*a*. The "circumferential direction" is a direction around the axis A of the insertion hole 30*a*. In the above description, the "axial direction", "radial direction", and "circumferential direction" are defined with reference to the axis A of the insertion hole 30*a*. The "axial direction", "radial direction", and "circumferential direction" may be defined with respect to an axis of the rotating shaft 1 as a reference instead of the axis A of the insertion hole 30*a*.

Figure 3:
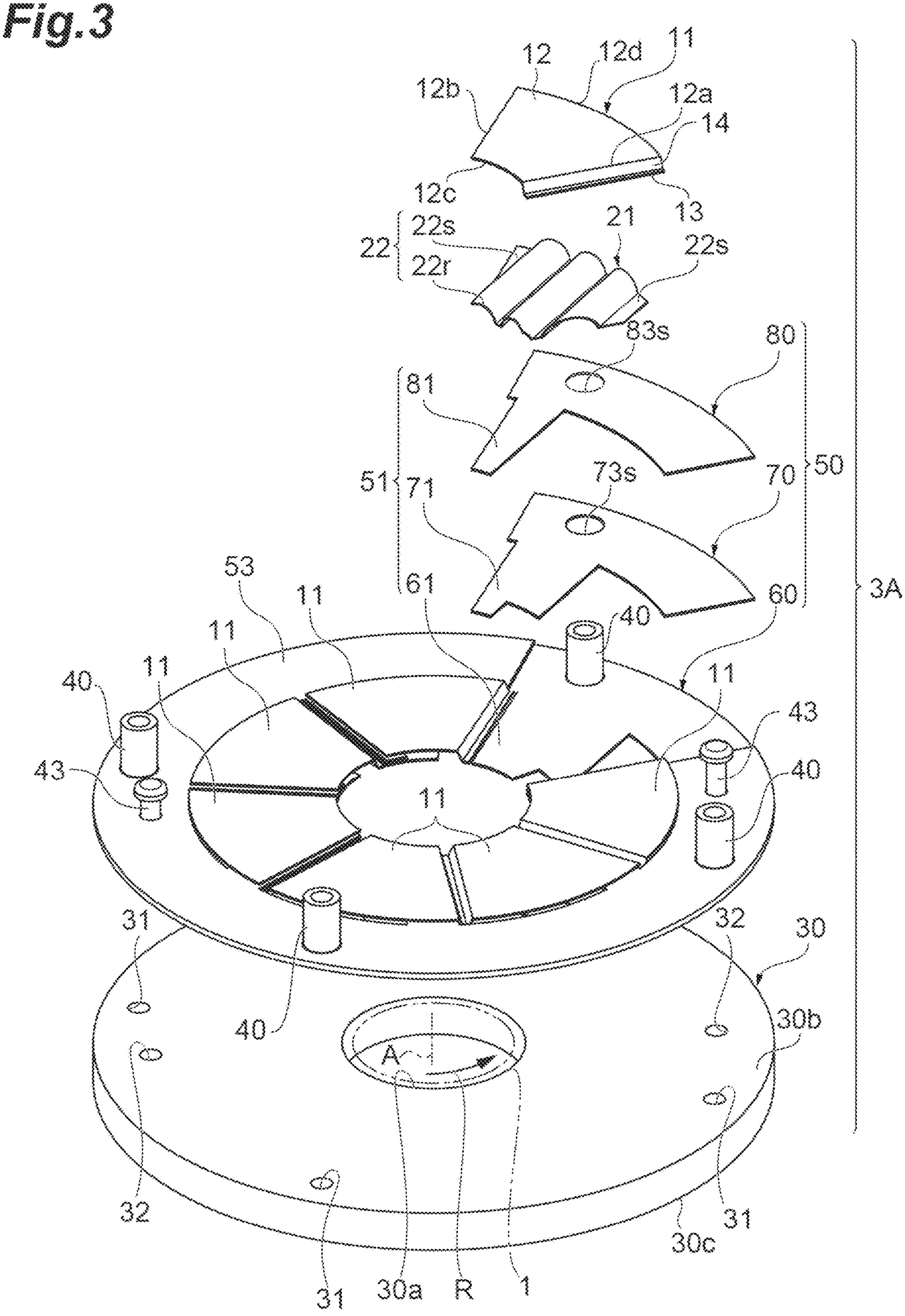
FIG. 3 is a partially exploded perspective view of the thrust foil bearing of the present disclosure.

As shown in FIG. 3, the base plate 30 forms an outermost portion of the thrust foil bearing 3A in the axial direction. The outermost portion of the thrust foil bearing 3A means a side far from the thrust collar 4. The base plate 30 is an annular plate member. The base plate 30 is a metal plate. As an example, a thickness of the base plate 30 is approximately several mm. An outer shape of the base plate 30 may be different from a circular plate. The outer shape of the base plate 30 may be rectangular. The base plate 30 has the insertion hole 30*a*, a support surface 30*b*, and a rear surface 30*c*.

The insertion hole 30*a* is a through hole. The insertion hole 30*a* extends from the support surface 30*b* to the rear surface 30*c*. The insertion hole 30*a* does not necessarily have to have a strict cylindrical shape. The rotating shaft 1 (see FIG. 2) is disposed in the insertion hole 30*a*. An inner diameter of the insertion hole 30*a* is larger than an outer diameter of the rotating shaft 1.

The support surface 30*b* is a flat surface. The support surface 30*b* extends in the direction perpendicular to the axial direction of the insertion hole 30*a*. The support surface 30*b* faces the thrust collar 4. The plurality of top foil pieces 11, the plurality of bump foil pieces 21, and the stepped member 50 are disposed around the insertion hole 30*a* formed in the support surface 30*b*. The stepped member 50 is attached to the support surface 30*b*. A portion of the top foil piece 11 is attached to the support surface 30*b*. The top foil piece 11 is supported by the bump foil piece 21. Even in a case where an inclusion is present, the top foil piece 11 itself may function as a member that receives a load. The bump foil piece 21 is supported by the base plate 30 and the stepped member 50. The top foil piece 11 is supported by the base plate 30 and the stepped member 50 via the bump foil piece 21.

The number of top foil pieces 11 is seven. The plurality of top foil pieces 11 may be collectively referred to as a top foil.

The number of bump foil pieces 21 is also seven. The plurality of bump foil pieces 21 may be collectively referred to as a bump foil. The top foil pieces 11 and the bump foil pieces 21 are disposed at equal intervals along the circumferential direction. The number of top foil pieces 11 is not limited to seven. The number of top foil pieces 11 may be less than seven. The number of top foil pieces 11 may be more than seven. The number of bump foil pieces 21 is not limited to seven. The number of bump foil pieces 21 may be less than seven. The number of bump foil pieces 21 may be more than seven.

The top foil piece 11 has an inclined portion 12 and an attachment portion 13. The inclined portion 12 is inclined upward along the circumferential direction from an upstream side to a downstream side in a rotation direction R of the rotating shaft 1. The inclined portion 12 of the top foil piece 11 faces the thrust collar 4. Inclining upward means a morphology gradually separating from the base plate 30 from the upstream side to the downstream side in the rotation direction R. Inclining upward means a morphology approaching the thrust collar 4 from the upstream side to the downstream side in the rotation direction R. The attachment portion 13 is connected to the inclined portion 12 via a bent portion 14. The attachment portion 13 is fixed to the base plate 30.

Figure 4A:
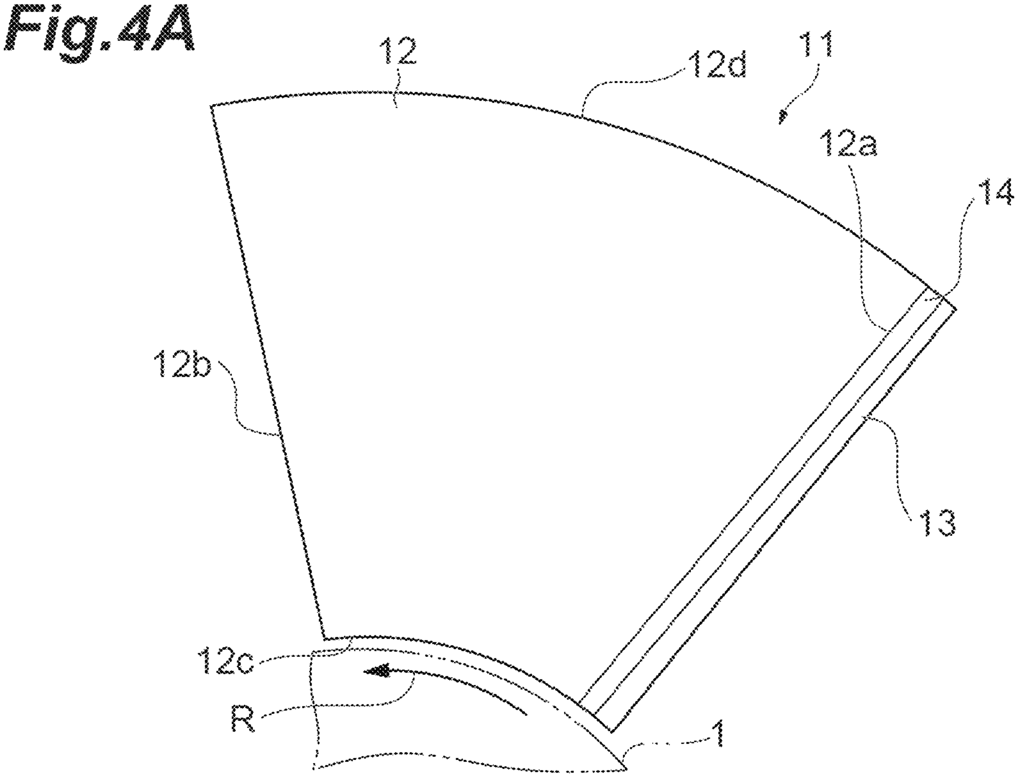
FIG. 4A is a plan view of a top foil piece.

As shown in FIG. 4A, the inclined portion 12 has a fan shape in a plan view. An apex of the fan-shaped inclined portion 12 is cut out. An inner periphery of the inclined portion 12 is an arc. An outer periphery of the inclined portion 12 is also an arc. The inclined portion 12 has a substantially trapezoidal shape in the plan view. The inclined portion 12 has an inclined portion front end 12*a*, an inclined portion rear end 12*b*, an inclined portion inner circumferential end 12*c*, and an inclined portion outer circumferential end 12*d*. The inclined portion front end 12*a* and the inclined portion rear end 12*b* extend in the radial direction. For example, with respect to the rotation direction R of the rotating shaft 1 as a reference, the downstream side may be defined as the inclined portion rear end 12*b*, and the upstream side may be defined as the inclined portion front end 12*a*. It is assumed that the rotation direction R of the rotating shaft 1 is counterclockwise. The definitions of the inclined portion front end 12*a* and the inclined portion rear end 12*b* are examples. Therefore, the inclined portion front end 12*a* and the inclined portion rear end 12*b* may be determined according to definitions different from those described above. The rotation direction R of the rotating shaft 1 may also be clockwise.

The inclined portion rear end 12*b* is a free end. The inclined portion rear end 12*b* is not fixed.

Figure 5:
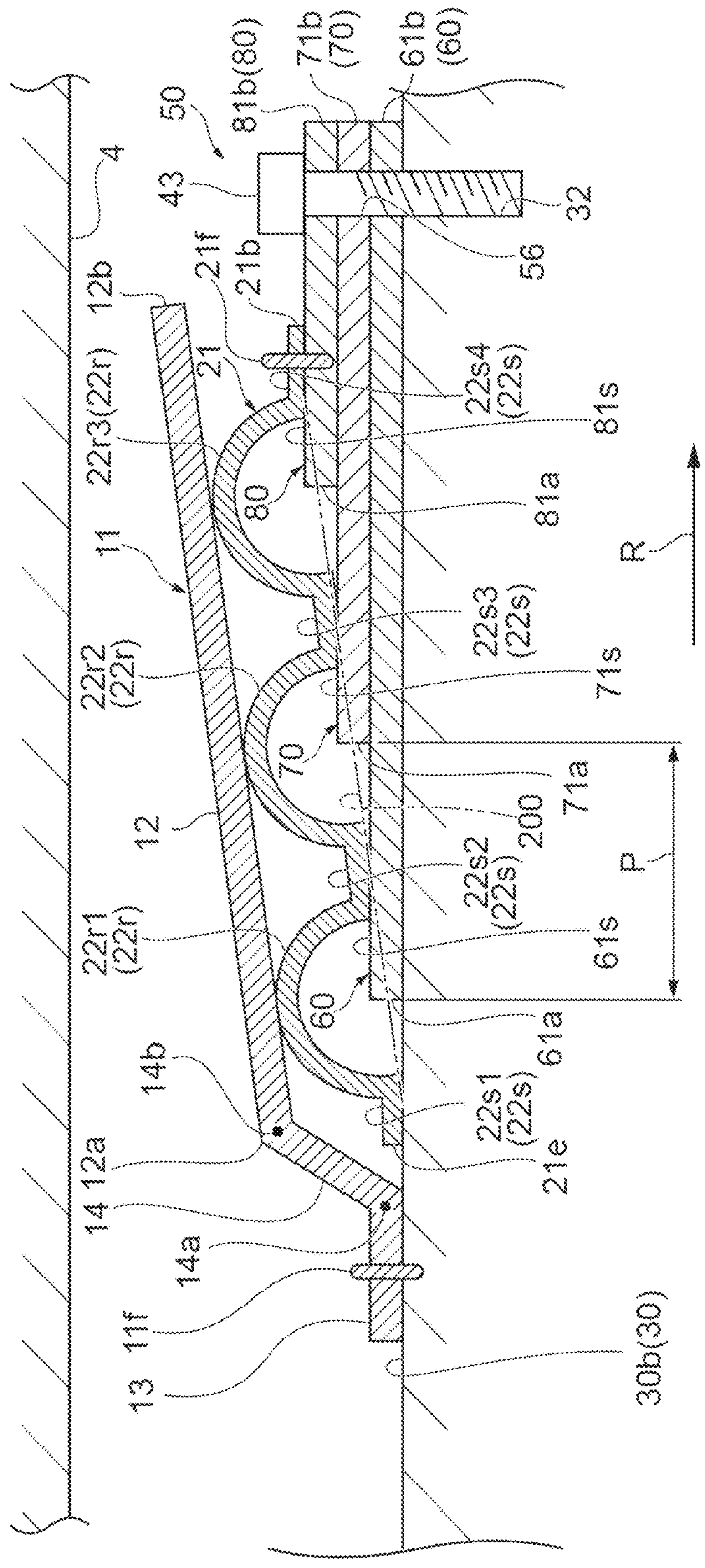
FIG. 5 is an enlarged cross-sectional view showing a main part of the thrust foil bearing of the present disclosure.

As shown in FIG. 5, the inclined portion front end 12*a* is connected to the attachment portion 13 via the bent portion 14. The bent portion 14 includes a first bend 14*a* and a second bend 14*b*. The first bend 14*a* is a portion where the attachment portion 13 is connected to the bent portion 14. The second bend 14*b* is a portion where the bent portion 14 is connected to the inclined portion 12. The first bend 14*a* and the second bend 14*b* both have obtuse angles.

The inclined portion 12 is supported by the bump foil piece 21. The inclined portion 12 is inclined with respect to the support surface 30*b*. For example, an inclination of the inclined portion 12 is based on an initial inclination angle determined by the first bend 14*a* and the second bend 14*b*. As a result, the inclined portion 12 gradually moves away from the base plate 30 along the rotation direction R of the rotating shaft 1. The initial inclination angle is an angle of the inclined portion 12 of the top foil piece 11 with respect to the support surface 30*b* of the base plate 30 when the load is zero.

A length of the attachment portion 13 in the radial direction is the same as a length of the bent portion 14. A shape of the attachment portion 13 is a band shape extending in the radial direction. The length of the attachment portion 13 may be different from the length of the bent portion 14. The attachment portion 13 is fixed to the base plate 30 by a fixing element 11*f*. For example, spot welding may be adopted to fix the attachment portion 13 to the base plate 30. A screw fastening structure may be adopted to fix the attachment portion 13 to the base plate 30.

The bump foil pieces 21 are arranged in the circumferential direction. The bump foil piece 21 is disposed between the top foil piece 11 and the base plate 30. The bump foil piece 21 is disposed on each of a plurality of stepped support portions 51, which will be described later. A shape of the bump foil piece 21 is fan-shaped in the plan view. A size of the bump foil piece 21 is smaller than a size of the inclined portion 12 of the top foil piece 11. Therefore, the bump foil piece 21 is covered by the top foil piece 11. The shape of the bump foil piece 21 is the same as a shape of the top foil piece 11.

Figure 4B:
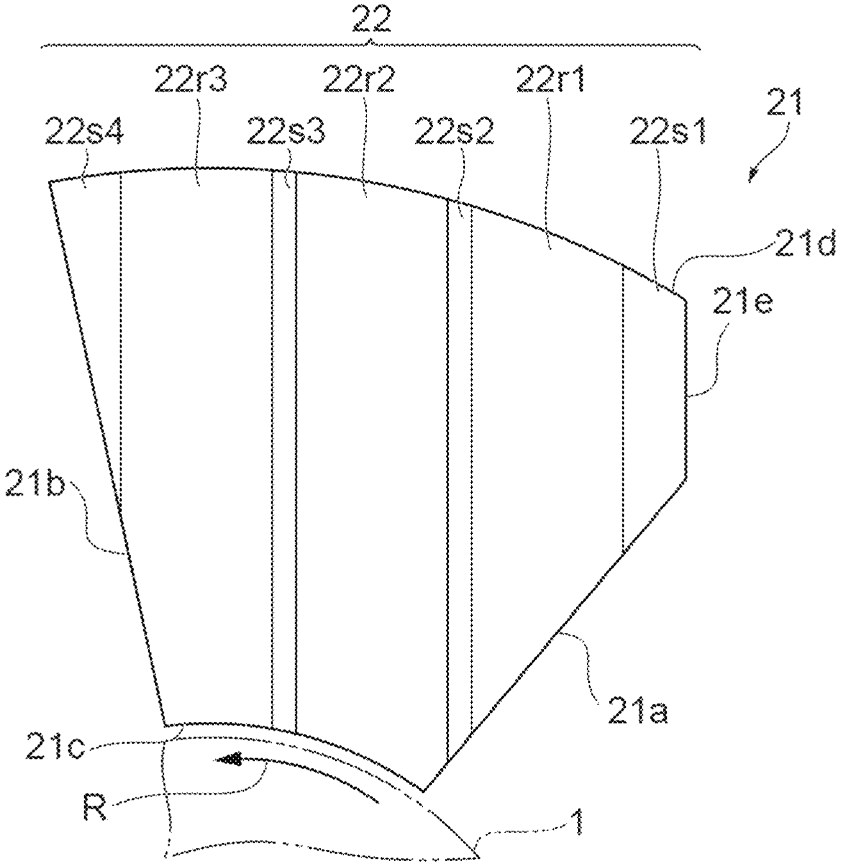
FIG. 4B is a plan view of a bump foil piece.

As shown in FIG. 4B, the shape of the bump foil piece 21 is fan-shaped in the plan view. An apex of the fan-shaped bump foil piece 21 is cut out. An inner periphery of the bump foil piece 21 is an arc. An outer periphery of the bump foil piece 21 is also an arc. The bump foil piece 21 has a bump foil front end 21*a*, a bump foil rear end 21*b*, a bump foil inner circumferential end 21*c*, a bump foil outer circumferential end 21*d*, and a bump foil base end 21*e*. The bump foil front end 21*a* and the bump foil rear end 21*b* extend in the radial direction. For example, with respect to the rotation direction R of the rotating shaft 1 as a reference, the upstream side may be defined as the bump foil front end 21*a*. Furthermore, the downstream side may be defined as the bump foil rear end 21*b*. The bump foil base end 21*e* is formed between the bump foil front end 21*a* and the bump foil outer circumferential end 21*d*.

The bump foil piece 21 has a support portion 22. The support portion 22 elastically supports the inclined portion 12 of the top foil piece 11. The support portion 22 is a corrugated foil. The support portion 22 has three crest portions 22*r*1, 22*r*2, and 22*r*3 and four valley portions 22*s*1, 22*s*2, 22*s*3, and 22*s*4 (contact portions). In the following description, the crest portions 22*r*1, 22*r*2, and 22*r*3 are simply referred to as crest portions 22*r* in a case where there is no need to distinguish therebetween. The valley portions 22*s*1, 22*s*2, 22*s*3, and 22*s*4 are simply referred to as valley portions 22*s* in a case where there is no need to distinguish therebetween.

The support portion 22 may employ, for example, spring foils described in Japanese Unexamined Patent Publication No. 2006-57652 and Japanese Unexamined Patent Publication No. 2004-270904. The support portion 22 may employ a bump foil or the like described in Japanese Unexamined Patent Publication No. 2009-299748. The spring foils described in Japanese Unexamined Patent Publication No. 2006-57652 and Japanese Unexamined Patent Publication No. 2004-270904 are used for radial bearings. Similarly, the bump foil described in Japanese Unexamined Patent Publication No. 2009-299748 is also used for radial bearings. An annular plate-shaped foil is obtained by deploying a foil used for a radial bearing into a planar shape. This foil may be used as the support portion 22 of the thrust foil bearing 3A.

The bump foil base end 21*e* extends from an inner circumference toward an outer circumference. When the bump foil front end 21*a* is virtually extended, the bump foil front end 21*a* intersects the axis A. Unlike the bump foil front end 21*a*, the bump foil base end 21*e* does not intersect the axis A even if the bump foil base end 21*e* is virtually extended. A direction in which the bump foil base end 21*e* extends is parallel to a direction in which the crest portions 22*r* and valley portions 22*s* extend. The crest portions 22*r* and the valley portions 22*s* are arranged alternately along a direction perpendicular to the direction in which the bump foil base end 21*e* extends.

As shown in FIG. 5, the valley portion 22*s* includes a flat surface. The plurality of valley portions 22*s*1, 22*s*2, 22*s*3, and 22*s*4 are arranged at equal intervals. None of the valley portions 22*s* are in contact with the top foil piece 11. The valley portion 22*s*1 is in contact with the base plate 30. The valley portion 22*s*1 includes the bump foil base end 21*e*. The valley portion 22*s*1 (first portion) is not fixed to the base plate 30. The bump foil base end 21*e* is a free end. The bump foil base end 21*e* is not fixed. The bump foil front end 21*a* is also a free end. The bump foil front end 21*a* is also not fixed. When a load is applied to the bump foil piece 21, the bump foil base end 21*e* and the bump foil front end 21*a* may move.

The valley portions 22*s*2, 22*s*3, and 22*s*4 (second portions) are in contact with the stepped member 50. For example, the valley portion 22*s*4 is fixed to the stepped member 50 by a fixing element 21*f*. The valley portion 22*s*4 includes the bump foil rear end 21*b*. For example, spot welding may be adopted to fix the bump foil rear end 21*b* to the stepped member 50. A screw fastening structure may be adopted to fix the bump foil rear end 21*b* to the stepped member 50. A welding position is an attachment position of the bump foil piece 21 in the circumferential direction. Therefore, with respect to the rotation direction R as a reference, the attachment position of the bump foil piece 21 is an end portion on the downstream side. On the other hand, with respect to the rotation direction R as a reference, an attachment position of the top foil piece 11 is an end portion on the upstream side. The attachment position of the bump foil piece 21 is opposite to the position of the top foil piece 11 with respect to the rotation direction R as a reference.

The crest portion 22*r* is an arch-shaped portion. Heights of the crest portions 22*r* are constant. The plurality of crest portions 22*r*1, 22*r*2, and 22*r*3 are arranged at equal intervals. The crest portions 22*r* are in contact with the inclined portion 12 of the top foil piece 11. The crest portions 22*r* are not in contact with the base plate 30. The crest portions 22*r* are not in contact with the stepped support portion 51 either. The crest portion 22*r*1 connects the valley portions 22*s*1 and 22*s*2. The crest portion 22*r*2 connects the valley portions 22*s*2 and 22*s*3. The crest portion 22*r*3 connects the valley portions 22*s*3 and 22*s*4.

<Stepped Member>

Figure 6:
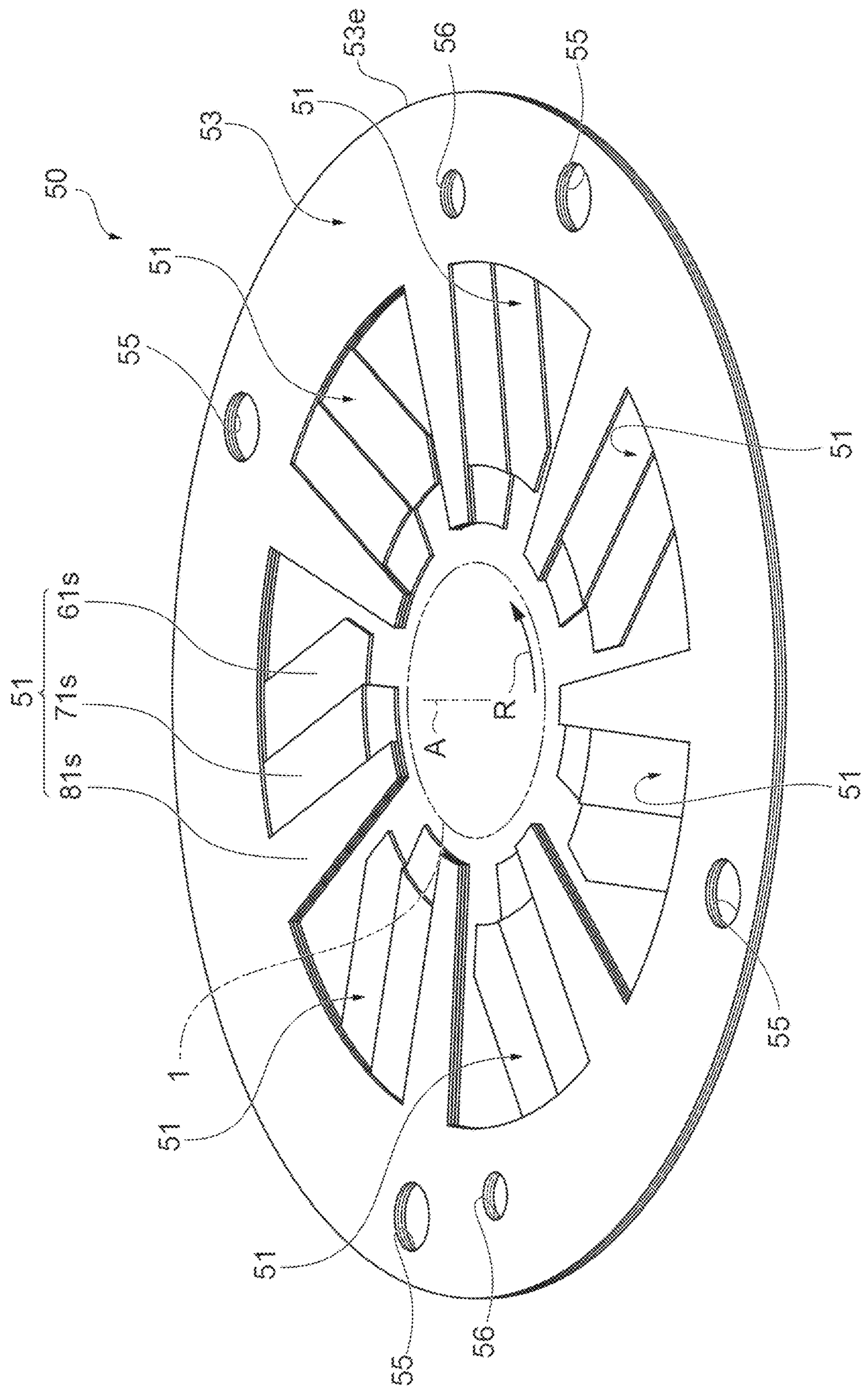
FIG. 6 is a perspective view of a stepped member included in the thrust foil bearing of the present disclosure.

As shown in FIG. 6, the stepped member 50 is a separate body from the base plate 30. The stepped member 50 is placed on the support surface 30*b*. The term "separate body" means that the stepped member 50 and the base plate 30 are not formed from a single metal block by processing such as machining. The stepped member 50 is prepared by a different process from that of the base plate 30. The base plate 30 is also prepared by a different process from that of the stepped member 50. The base plate 30 and the stepped member 50, which were prepared separately, form the thrust foil bearings 3A and 3B through an assembly step of integrating the base plate 30 and the stepped member 50. For example, in a case where the base plate 30 and the stepped member 50 are integrated with each other by a fastener such as a bolt, the stepped member 50 may be detached from the base plate 30 by releasing the fastening. A boundary line exists between the base plate 30 and the stepped member 50, where the base plate 30 and the stepped member 50 are in contact with each other and the base plate 30 and the stepped member 50 are distinguished from each other.

The stepped member 50 has the plurality of stepped support portions 51 and a sandwiched portion 53. The stepped support portion 51 supports the bump foil piece 21. The number of stepped support portions 51 included in the stepped member 50 is seven. The number of stepped support portions 51 may be more than seven. The number of stepped support portions 51 may be less than seven. The stepped support portions 51 are disposed at approximately equal intervals in the circumferential direction. A shape of the sandwiched portion 53 is annular in the plan view. An outer circumferential edge of the sandwiched portion 53 is arc-shaped. A shape of the stepped member 50 shown in FIG. 6 is annular in the plan view. The sandwiched portion 53 has an outer circumferential edge 53*e* that is a series of arcs. As used herein, the term "arc" includes a closed arc, as shown in FIG. 6. The closed arc includes, for example, an arc having a central angle of 360 degrees. The "arc" also includes a portion of a ring. The portion of the ring includes, for example, an arc having a central angle of less than 360 degrees. A sandwiched portion that is an arc having a central angle of less than 360 degrees and includes an outer circumferential edge will be described later. The arc does not necessarily have to be a perfect circular shape or a portion of a perfect circular shape. The plurality of stepped support portions 51 are provided inside the sandwiched portion 53. The plurality of stepped support portions 51 are integrated with the sandwiched portion 53 as one body.

First through holes 55 are formed in the sandwiched portion 53. The first through holes 55 are for the bearing spacers 40. The number of first through holes 55 is, for example, four. The first through holes 55 may be disposed along the circumferential direction so that a central angle therebetween is approximately 90 degrees. As shown in FIG. 2, in a state in which the stepped member 50 is disposed on the base plate 30, the support surface 30*b* of the base plate 30 is exposed from the first through hole 55. The first through hole 55 overlaps with the through hole 42 of the base plate 30. The bearing spacer 40 is inserted into the first through hole 55. An inner diameter of the first through hole 55 is the same as an outer diameter of the bearing spacer 40. Alternatively, the inner diameter of the first through hole 55 is slightly larger than the outer diameter of the bearing spacer 40. A first end surface 40*a* of the bearing spacer 40 disposed in the first through hole 55 contacts the base plate 30 of the thrust foil bearing 3A. The second end surface 40*b* of the bearing spacer 40 abuts the base plate 30 of the thrust foil bearing 3B.

Furthermore, second through holes 56 are formed in the sandwiched portion 53. The second through holes 56 are for the fastening bolts 43. The number of second through holes 56 is, for example, two. The second through holes 56 may be disposed along the circumferential direction so that a center angle therebetween is approximately 180 degrees. A diameter of a second reference circle that serves as a reference for the disposition of the second through holes 56 may be smaller than a diameter of a first reference circle that serves as a reference for the disposition of the first through holes 55. The second through hole 56 may be formed inward of the first through hole 55. As shown in FIG. 5, the fastening bolt 43 fixes the stepped member 50 to the base plate 30. A tip portion of the fastening bolt 43 is screwed into a screw hole 32 of the base plate 30. Therefore, the second through hole 56 overlaps with the screw hole 32 of the base plate 30. An inner diameter of the second through hole 56 may be smaller than the inner diameter of the first through hole 55.

As shown in FIG. 3, the stepped member 50 includes a first shim 60 (plate member), a second shim 70 (plate member), and a third shim 80 (plate member). The first shim 60, the second shim 70, and the third shim 80 are plate members made of metal. Thicknesses of the first shim 60, the second shim, and the third shim 80 are each constant. Shapes of the first shim 60, the second shim 70, and the third shim 80 are plate-shaped. The first shim 60, the second shim 70, and the third shim 80 are stacked in a thickness direction thereof.

The number of shims forming the stepped member 50 is the same as the number of crest portions 22*r* of the bump foil piece 21. In the configuration shown in FIG. 5, the number of crest portions 22*r* is three. Therefore, the number of shims is also three. The number of shims forming the stepped member 50 is one less than the number of valley portions 22*s*. In the configuration shown in FIG. 5, the number of valley portions 22*s* is four. Therefore, the number of shims is three, which is one less than four.

<First Shim>

Figure 7:
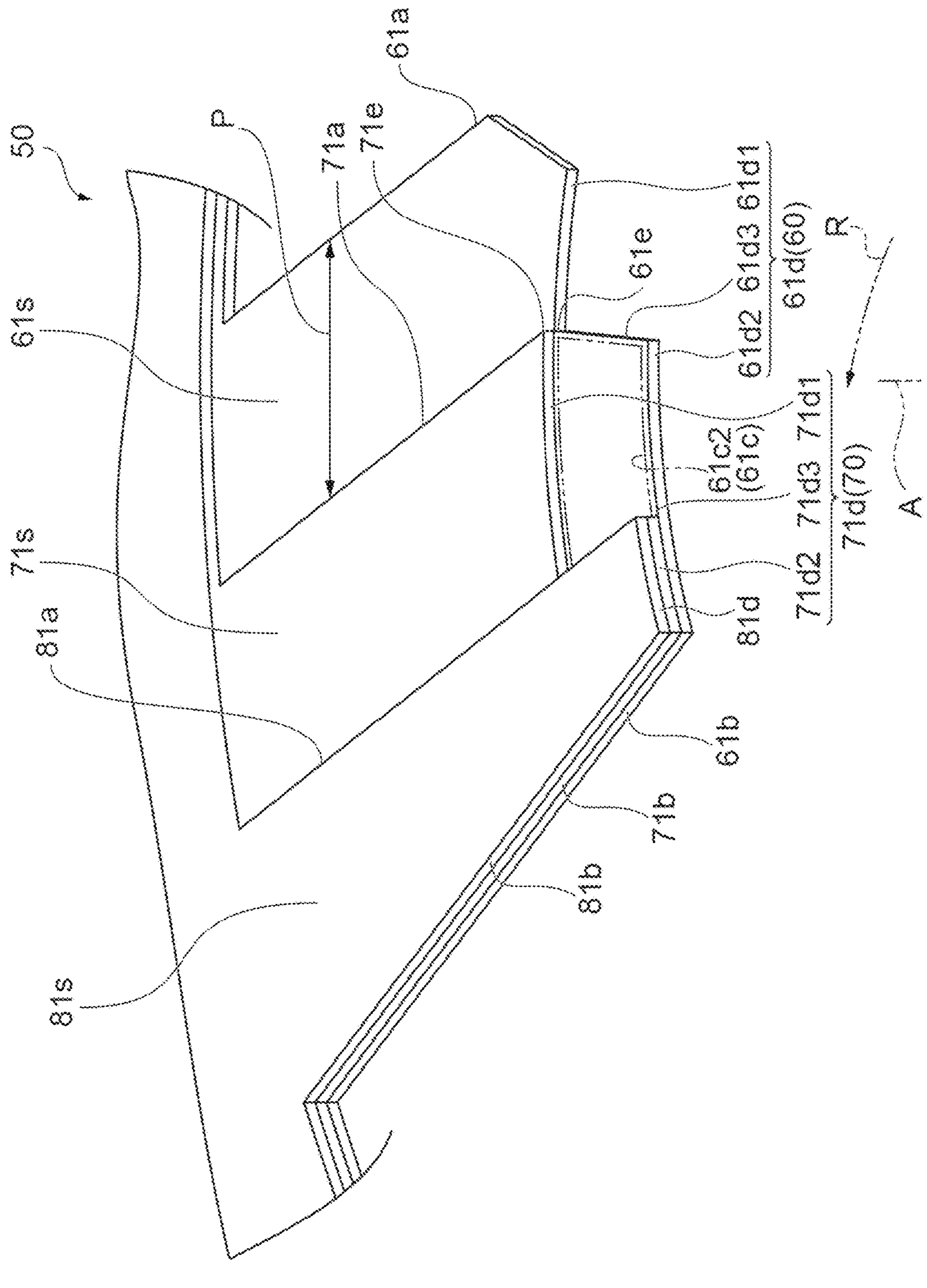
FIG. 7 is an enlarged perspective view showing a stepped support portion.
Figure 8:
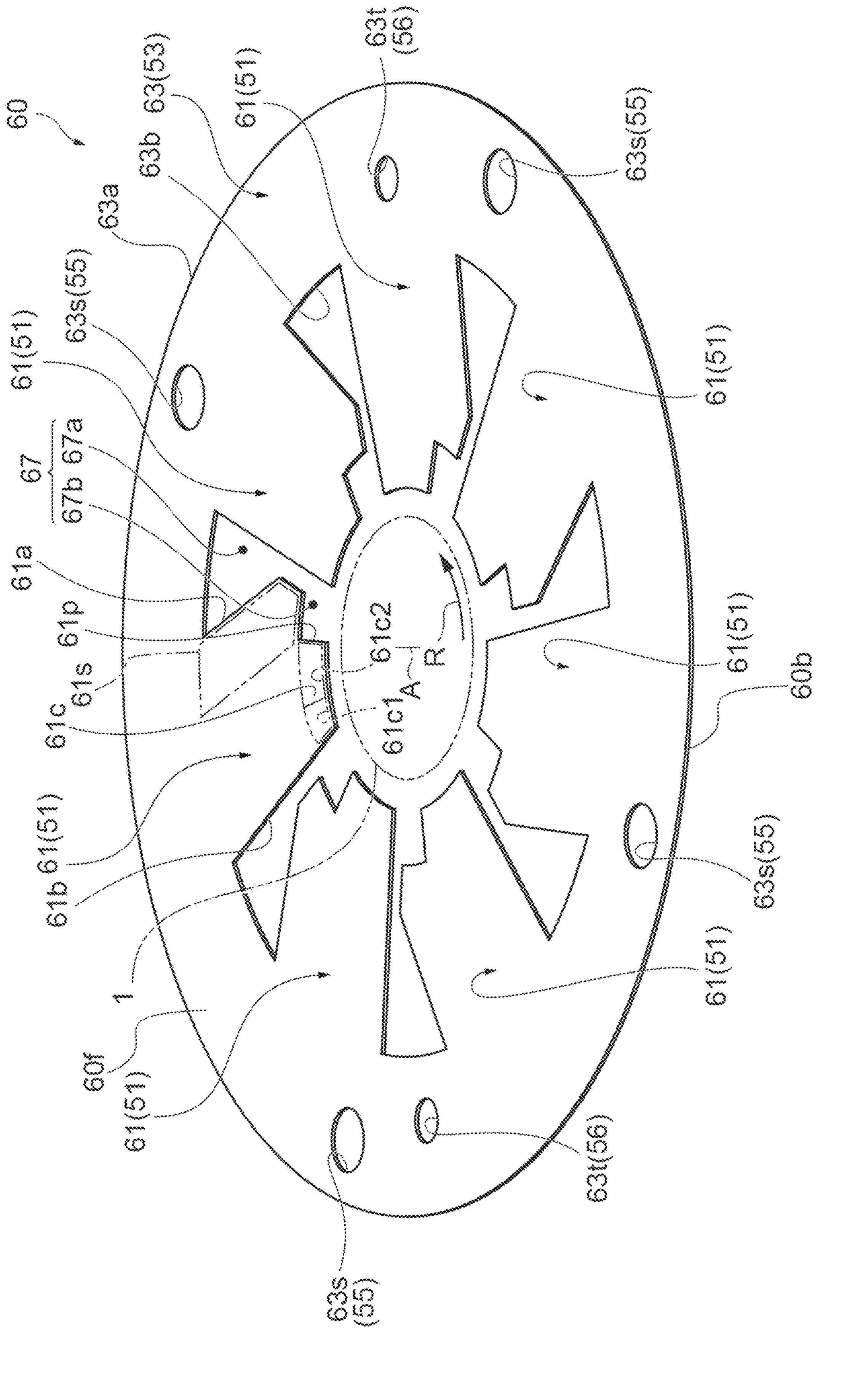
FIG. 8 is a perspective view of a first shim included in the stepped member.

As shown in FIGS. 7 and 8, the first shim 60 (first plate member) includes a plurality of first stepped support regions 61 (first support regions) and a first sandwiched portion 63.

The first stepped support region 61 forms the stepped support portion 51 together with a second stepped support region 71 and a third stepped support region 81, which will be described later. The first stepped support region 61 has a first stepped support front end surface 61*a* (first front end surface), a first stepped support rear end surface 61*b* (first rear end surface), and a first stepped inner circumferential region 61*c*.

The first shim 60 has a first shim rear surface 60*b* and a first shim main surface 60*f*. The first shim rear surface 60*b* is in contact with the base plate 30. The first shim main surface 60*f* is in contact with the second shim 70. An entire surface of the first shim rear surface 60*b* is in contact with the support surface 30*b* of the base plate 30. The first shim main surface 60*f* has a portion that is in contact with the second shim 70 and a portion that is not in contact with the second shim 70. The portion that is not in contact with the second shim 70 is included in the first stepped support region 61. A portion of the first stepped support region 61 that is not in contact with the second shim 70 is a first stepped surface 61*s*. The first stepped surface 61*s* is connected to the first stepped support front end surface 61*a*. The first stepped surface 61*s* supports the valley portion 22*s*2 of the bump foil piece 21 (see FIG. 5).

Shapes of the plurality of first stepped support regions 61 are the same. The plurality of first stepped support regions 61 are arranged in the circumferential direction along the first sandwiched portion 63. A planar shape of the first sandwiched portion 63 is annular. The plurality of first stepped support regions 61 are disposed inside the first sandwiched portion 63. A groove 67 extending from an outer diameter side to an inner diameter side is formed between two first stepped support regions 61 adjacent to each other in the circumferential direction. The groove 67 has a contraction portion 67*a* and an expansion portion 67*b*. A width of the contraction portion 67*a* in the circumferential direction decreases from the outer diameter side toward the inner diameter side. In the contraction portion 67*a*, an interval between the adjacent first stepped support regions 61 decreases toward the axis A. A width of the expansion portion 67*b* in the circumferential increases from the outer diameter side toward the inner diameter side. In the expansion portion 67*b*, an interval between the adjacent first stepped support regions 61 increases toward the axis A.

The first stepped support region 61 includes a first cut-out 61*p*. The first cut-out 61*p* is formed by cutting out a portion of the first stepped inner circumferential region 61*c*. The first cut-out 61*p* is formed on an upstream side of the first stepped inner circumferential region 61*c* along the rotation direction R. The first cut-out 61*p* is formed on a first stepped support front end surface 61*a* side. The first cut-out 61*p* is located closer to the first stepped support front end surface 61*a* than the first stepped support rear end surface 61*b*.

As shown in FIG. 7, the first stepped support region 61 has a stepped inner circumferential edge 61*d*. The stepped inner circumferential edge 61*d* includes a first inner circumferential edge portion 61*d*1 having an arc shape and a second inner circumferential edge portion 61*d*2 having an arc shape. The first inner circumferential edge portion 61*d*1 is connected to the first stepped support front end surface 61*a*. The second inner circumferential edge portion 61*d*2 is connected to the first stepped support rear end surface 61*b*. In a case where the rotation direction R is used as a reference, the first inner circumferential edge portion 61*d*1 is provided upstream of the second inner circumferential edge portion 61*d*2.

A distance from the axis A to the first inner circumferential edge portion 61*d*1 is defined as a first radius. A distance from the axis A to the second inner circumferential edge portion 61*d*2 is defined as a second radius. The first radius of the first inner circumferential edge portion 61*d*1 is larger than the second radius of the second inner circumferential edge portion 61*d*2. The first inner circumferential edge portion 61*d*1 is further away from the axis A than the second inner circumferential edge portion 61*d*2.

The first inner circumferential edge portion 61*d*1 is connected to the second inner circumferential edge portion 61*d*2 by a connecting edge portion 61*d*3. The connecting edge portion 61*d*3 may extend in the radial direction. The connecting edge portion 61*d*3 may be inclined with respect to the radial direction. The connecting edge portion 61*d*3 is inclined with respect to the radial direction. The first cut-out 61*p* is a portion surrounded by the connecting edge portion 61*d*3 and the first inner circumferential edge portion 61*d*1.

A position of the second inner circumferential edge portion 61*d*2 is inward of the first inner circumferential edge portion 61*d*1. The first stepped inner circumferential region 61*c* is a region surrounded by a virtual line extending from the first inner circumferential edge portion 61*d*1 in the circumferential direction, the second inner circumferential edge portion 61*d*2, the connecting edge portion 61*d*3, and the first stepped support rear end surface 61*b*. The first stepped inner circumferential region 61*c* includes an inner circumferential surface overlapping region 61*c*1 and an inner circumferential surface exposed region 61*c*2 (see FIG. 8). The inner circumferential surface overlapping region 61*c*1 overlaps with the second shim 70 and the third shim 80, which will be described later. A step corresponding to two shims formed by end surfaces of the second shim 70 and the third shim 80 is generated at a boundary between the inner circumferential surface overlapping region 61*c*1 and the inner circumferential surface exposed region 61*c*2.

The inner circumferential surface exposed region 61*c*2 does not overlap with the second shim 70. The inner circumferential surface exposed region 61c2 is exposed. The inner circumferential surface exposed region 61c2 includes the connecting edge portion 61d3. The inner circumferential surface overlapping region 61c1 includes the first stepped support rear end surface 61b. A position of the inner circumferential surface exposed region 61c2 is located upstream of the inner circumferential surface overlapping region 61c1. An area of the inner circumferential surface exposed region 61c2 is larger than an area of the inner circumferential surface overlapping region 61c1.

As shown in FIG. 8, the first sandwiched portion 63 forms the sandwiched portion 53 together with a second sandwiched portion 73 and a third sandwiched portion 83, which will be described later. The first sandwiched portion 63 has a first sandwiched outer circumferential surface 63a and a first sandwiched inner circumferential surface 63b. The first sandwiched outer circumferential surface 63a is a portion forming the outer circumferential edge 53e. A planar shape of the first sandwiched outer circumferential surface 63a is a closed arc (ring). The first sandwiched portion 63 has first hole portions 63s forming the first through holes 55 and second hole portions 63t forming the second through holes 56.

<Second Shim>

Figure 9:
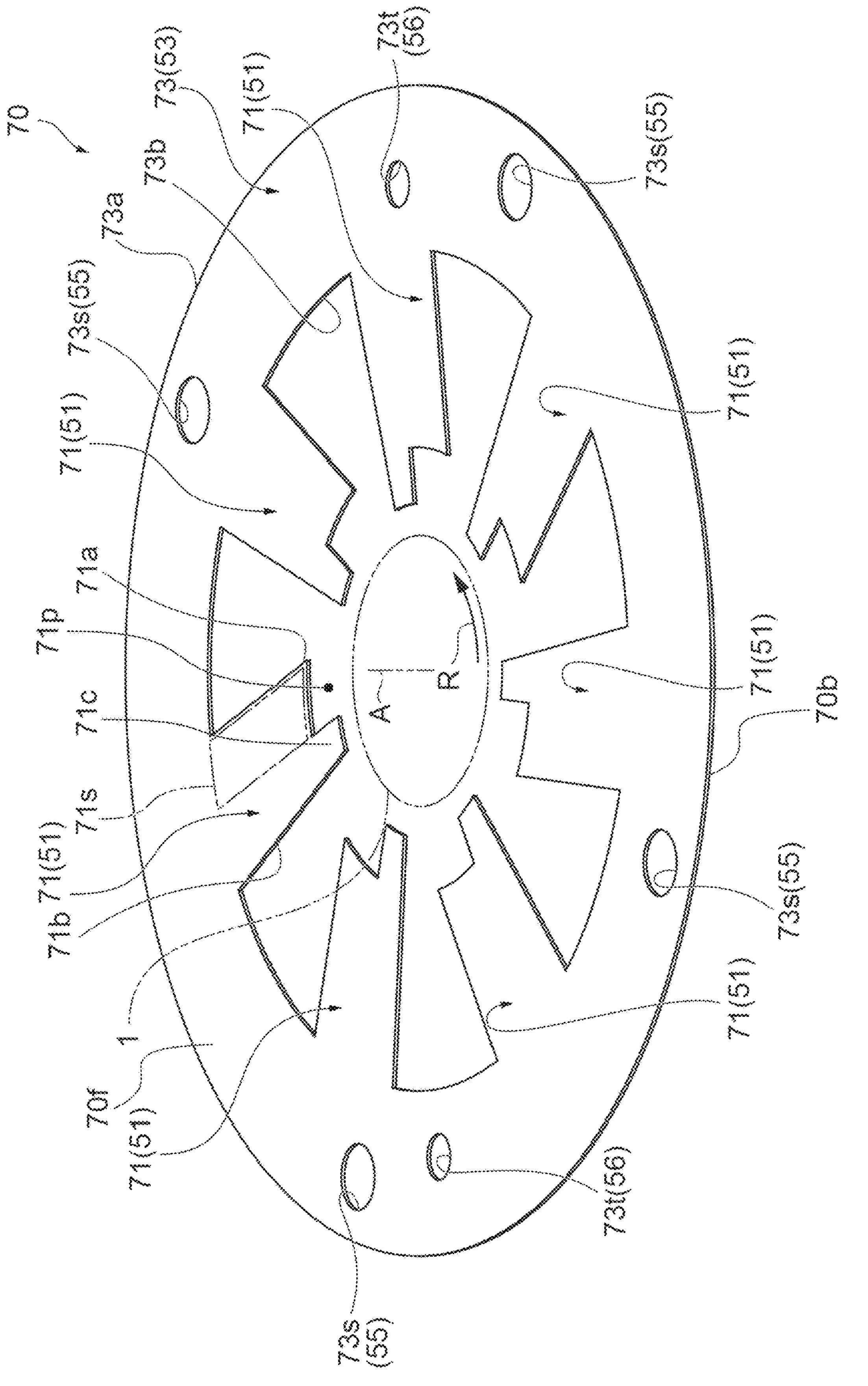
FIG. 9 is a perspective view of a second shim included in the stepped member.

As shown in FIGS. 7 and 9, the second shim 70 (second plate member) includes a plurality of second stepped support regions 71 (second support regions) and the second sandwiched portion 73.

The second stepped support region 71 has a second stepped support front end surface 71a (second front end surface), a second stepped support rear end surface 71b (second rear end surface), and a second stepped inner circumferential region 71c.

The second shim 70 has a second shim rear surface 70b in contact with the first shim main surface 60f, and a second shim main surface 70f in contact with the third shim 80. The second shim rear surface 70b is in contact with the first shim main surface 60f. The second shim main surface 70f is in contact with the third shim 80. An entire surface of the second shim rear surface 70b is in contact with the first shim main surface 60f. The second shim main surface 70f has a portion that is in contact with the third shim 80 and a portion that is not in contact with the third shim 80. The portion that is not in contact with the third shim 80 is included in the second stepped support region 71. A portion of the second stepped support region 71 that is not in contact with the third shim 80 is a second stepped surface 71s. The second stepped surface 71s supports the valley portion 22s3 of the bump foil piece 21 (see FIG. 5). A shape of the second stepped surface 71s is different from a shape of the first stepped surface 61s.

The second stepped surface 71s includes a second stepped support front end surface 71a. A circumferential length from the second stepped support front end surface 71a to the second stepped support rear end surface 71b is shorter than a circumferential length from the first stepped support front end surface 61a to the first stepped support rear end surface 61b. The first stepped surface 61s is formed by this difference in circumferential length. Due to the difference in circumferential length, the second stepped support front end surface 71a is shifted from the first stepped support front end surface 61a by a shift amount P (see FIG. 7). The difference in circumferential length corresponds to the shift amount P. The shift amount P may be the same as a pitch between the valley portions 22s of the bump foil piece 21. The first stepped support rear end surface 61b overlaps the second stepped support rear end surface 71b when viewed in the direction of the axis A.

The second stepped support region 71 includes a second cut-out 71p. The second cut-out 71p is formed by cutting out a portion of the second stepped inner circumferential region 71c. The second cut-out 71p is formed on an upstream side of the second stepped inner circumferential region 71c along the rotation direction R. The second cut-out 71p is formed on a second stepped support front end surface 71a side. The second cut-out 71p is located closer to the second stepped support front end surface 71a than the second stepped support rear end surface 71b.

Like the first stepped support region 61, the second stepped support region 71 also has a stepped inner circumferential edge 71d. The stepped inner circumferential edge 71d includes a first inner circumferential edge portion 71d1 (third inner circumferential edge portion), a second inner circumferential edge portion 71d2 (fourth inner circumferential edge portion), and a connecting edge portion 71d3. A shape of the first inner circumferential edge portion 71d1 is an arc. A shape of the second inner circumferential edge portion 71d2 is also an arc. The connecting edge portion 71d3 connects the first inner circumferential edge portion 71d1 and the second inner circumferential edge portion 71d2. A radius of the first inner circumferential edge portion 71d1 of the second stepped support region 71 is the same as a radius of the first inner circumferential edge portion 61d1 of the first stepped support region 61. A radius of the second inner circumferential edge portion 71d2 of the second stepped support region 71 is also the same as a radius of the second inner circumferential edge portion 61d2 of the first stepped support region 61. A circumferential length of the second inner circumferential edge portion 71d2 of the second stepped support region 71 is shorter than a circumferential length of the second inner circumferential edge portion 61d2 of the first stepped support region 61. As a result, the inner circumferential surface exposed region 61c2 is formed. A distance from the axis A to the first inner circumferential edge portion 71d1 is different from a distance from the axis A to the second inner circumferential edge portion 71d2. A distance from the axis A to the second inner circumferential edge portion 61d2 is shorter than the distance from the axis A to the first inner circumferential edge portion 71d1.

In the second stepped support region 71, a corner portion 71e is formed at a portion where the first inner circumferential edge portion 71d1 and the second stepped support front end surface 71a are connected. The corner portion 71e coincides with a corner portion 61e where the connecting edge portion 61d3 of the first stepped support region 61 and the first inner circumferential edge portion 61d1 are connected.

The second stepped inner circumferential region 71c is different from the first stepped inner circumferential region 61c. An entire surface of the second stepped inner circumferential region 71c is an overlapping region. The third shim 80 overlaps with the entire surface of the second stepped inner circumferential region 71c. For example, the circumferential length of the second inner circumferential edge portion 71d2 of the second stepped support region 71 is shorter than the circumferential length of the second inner circumferential edge portion 61d2 of the first stepped support region 61.

The second sandwiched portion 73 has a second sandwiched outer circumferential surface 73a and a second sandwiched inner circumferential surface 73b. The second sandwiched outer circumferential surface 73a is a portion forming the outer circumferential edge 53e together with the first sandwiched outer circumferential surface 63a. A planar shape of the second sandwiched outer circumferential surface 73*a* is a closed arc (ring). The second sandwiched portion 73 has hole portions 73*s* and hole portions 73*t*. The hole portions 73*s* form the first through holes 55. The hole portions 73*t* form the second through holes 56.

<Third Shim>

Figure 10:
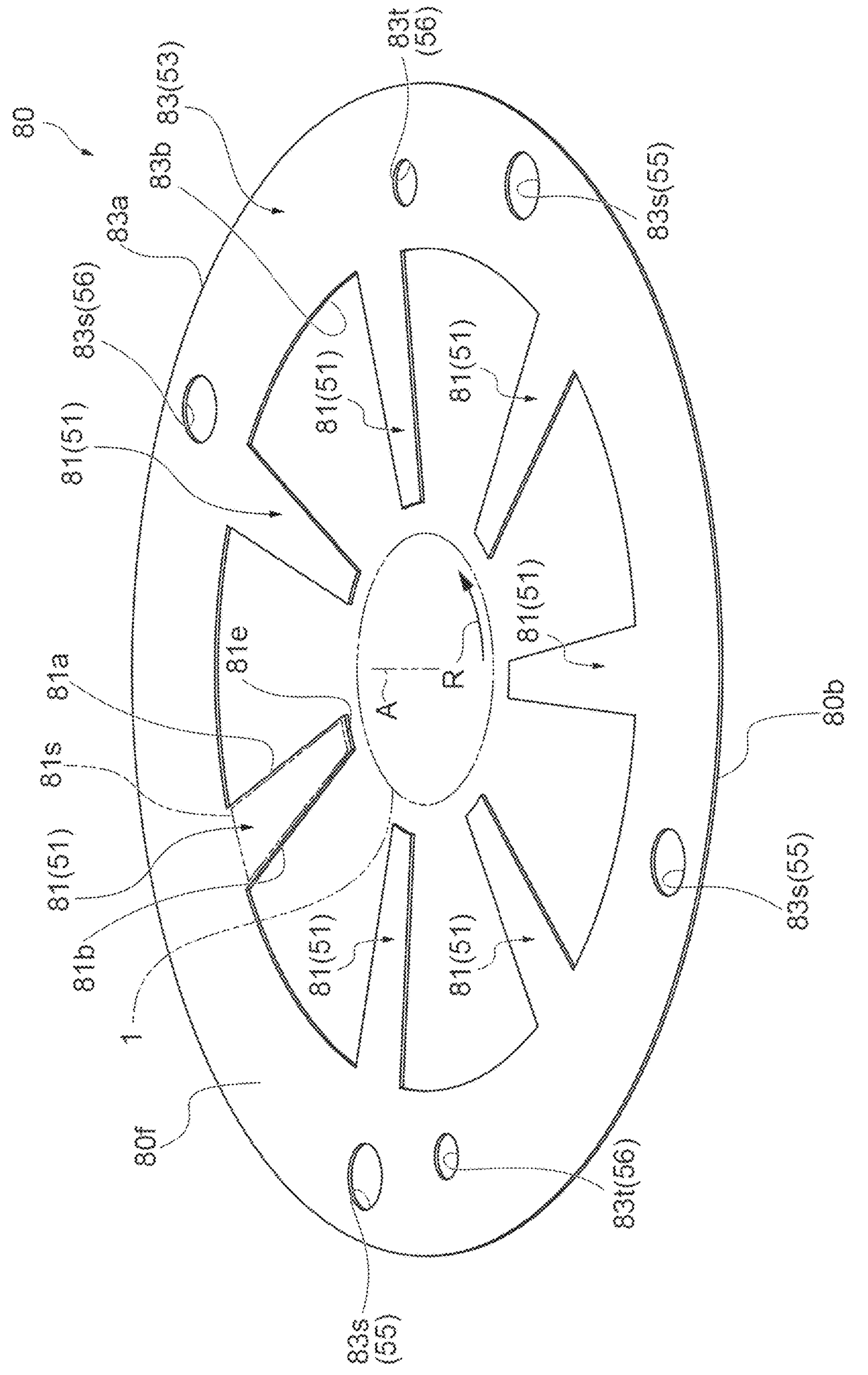
FIG. 10 is a perspective view of a third shim included in the stepped member.

As shown in FIGS. 7 and 10, the third shim 80 includes a plurality of third stepped support regions 81 and a third sandwiched portion 83.

The third stepped support region 81 has a third stepped support front end surface 81*a*, a third stepped support rear end surface 81*b*, and a third stepped inner circumferential edge 81*d*.

The third shim 80 has a third shim rear surface 80*b* and a third shim main surface 80*f*. The third shim rear surface 80*b* is in contact with the second shim main surface 70*f*. The valley portion 22*s*4 is fixed to the third shim main surface 80*f*. An entire surface of the third shim rear surface 80*b* is in contact with the second shim main surface 70*f*. The third stepped support region 81 has a third stepped surface 81*s*. The valley portion 22*s*4 of the bump foil piece 21 is fixed to the third stepped surface 81*s* (see FIG. 5). The fixing element 21*f* for fixing the valley portion 22*s*4 may be fixed only to the third shim 80. The fixing element 21*f* may be fixed not only to the third shim 80 but also to other elements. A shape of the third stepped surface 81*s* is different from the shape of the first stepped surface 61*s* and the shape of the second stepped surface 71*s*.

A circumferential length from the third stepped support front end surface 81*a* to the third stepped support rear end surface 81*b* is shorter than a circumferential length from the second stepped support front end surface 71*a* to the second stepped support rear end surface 71*b*. The second stepped surface 71*s* is formed by this difference in circumferential length. The second stepped support front end surface 71*a* is shifted from the third stepped support front end surface 81*a* by a shift amount P.

The third stepped support region 81 does not include a cut-out. Among the plurality of shims forming the stepped member 50, the shim placed at the top does not need to include a cut-out. A distance from the axis A to the third stepped inner circumferential edge 81*d* is the same as a distance from the axis A to the second inner circumferential edge portion 61*d*2 of the first stepped support region 61. The distance from the axis A to the stepped inner circumferential edge 81*d* of the third stepped support region 81 is the same as the distance from the axis A to the second inner circumferential edge portion 71*d*2 of the second stepped support region 71.

The third sandwiched portion 83 has a third sandwiched outer circumferential surface 83*a* and a third sandwiched inner circumferential surface 83*b*. The third sandwiched outer circumferential surface 83*a* is a portion forming the outer circumferential edge 53*e* together with the first sandwiched outer circumferential surface 63*a* and the second sandwiched outer circumferential surface 73*a*. A planar shape of the third sandwiched outer circumferential surface 83*a* is a closed arc (ring). The third sandwiched portion 83 has hole portions 83*s* forming the first through holes 55 and hole portions 83*t* forming the second through holes 56.

Actions and Effects

A stacked structure of the first shim 60, the second shim 70, and the third shim 80 described above forms a virtual incline. The thrust foil bearings 3A, 3B exhibit a supporting force by a lubricating fluid film formed between the top foil piece 11 and the thrust collar 4. The lubricating fluid film is influenced by a shape of a gap formed between the top foil piece 11 and the thrust collar 4. The shape of the gap is determined by an inclination of the top foil piece 11. The top foil piece 11 is supported by the bump foil piece 21. The bump foil piece 21 is supported by the stepped member 50. The shape of the gap is determined by the shape of the stepped member 50.

As shown in FIG. 5, the bump foil piece 21 is in contact with the stepped member 50. However, not the entire surface of the bump foil piece 21 is in contact with the stepped member 50. The bump foil piece 21 is in contact with the stepped member 50 at the valley portion 22*s*. An inclination of the bump foil piece 21 is determined by the shape of the stepped member 50 in contact with the valley portion 22*s*. For example, the inclination of the bump foil piece 21 may be regarded as a virtual incline 200. The virtual incline 200 is a virtual plane that virtually connects the portions of the stepped member 50 that are in contact with the valley portions 22*s*. For example, an incline between the valley portion 22*s*2 and the valley portion 22*s*3 does not need to continuously increase in height. The inventors conceived the idea that a step that discontinuously increases in height may be included between the valley portions 22*s*2 and 22*s*3. The inventors further conceived the idea that in order to implement a virtual incline with steps, shims with precisely controlled thicknesses may be stacked.

The thrust foil bearings 3A and 3B include the base plate 30 having the insertion hole 30*a* through which the rotating shaft 1 is inserted and the support surface 30*b*, the plurality of top foil pieces 11 supported by the support surface 30*b*, the stepped member 50 that is placed on the support surface, is formed as a separate body from the base plate 30, and includes the plurality of stepped support portions 51 formed by a plurality of the stepped surfaces 61*s*, 71*s*, and 81*s*, and a plurality of bump foil pieces that are disposed between the top foil pieces 11 and the base plate 30, are respectively disposed on the plurality of stepped support portions 51, and include the valley portions 22*s* in contact with the stepped surfaces 61*s*, 71*s*, and 81*s*.

The thrust foil bearings 3A and 3B have the stepped member 50 that is provided as a separate body from the base plate 30. According to the stepped member 50, deviations in step dimensions from the design values may be readily reduced. As a result, a decrease in load capacity due to the deviations in step dimensions is suppressed. Therefore, the thrust foil bearings 3A and 3B may exhibit a desired load capacity.

The plurality of stepped support portions 51 of the thrust foil bearings 3A and 3B are provided to surround the insertion hole 30*a*. According to such a configuration, the plurality of stepped support portions 51 may be provided around the insertion hole 30*a*.

The first shim 60 of the thrust foil bearings 3A and 3B has the first sandwiched portion 63 including the arc-shaped outer circumferential edge, and the first stepped support region 61 provided between the first sandwiched portion 63 and the insertion hole 30*a* when viewed in the direction of the axis A of the insertion hole 30*a*. The second shim 70 includes the second sandwiched portion 73 including the arc-shaped outer circumferential edge, and the second stepped support region 71 provided between the second sandwiched portion 73 and the insertion hole 30*a* when viewed in the direction of the axis A of the insertion hole 30*a*. The stepped support portion 51 is formed by stacking the first stepped support region 61 and the second stepped support region 71. With such a configuration as well, the desired load capacity may be exhibited.

A shape of the second stepped support region 71 of the thrust foil bearings 3A and 3B is different from a shape of the first stepped support region 61 when viewed in the direction of the axis A of the insertion hole 30*a*. According to such a configuration, the virtual incline 200 that supports the bump foil piece 21 may be formed.

The first stepped support region 61 of the thrust foil bearings 3A and 3B includes the stepped inner circumferential edge 61*d* extending to surround the insertion hole 30*a*. The stepped inner circumferential edge 61*d* includes the first inner circumferential edge portion 61*d*1 and the second inner circumferential edge portion 61*d*2. The distance from the axis A of the insertion hole 30*a* to the first inner circumferential edge portion 61*d*1 is different from the distance from the axis A of the insertion hole 30*a* to the second inner circumferential edge portion 61*d*2. With such a configuration as well, the desired load capacity may be exhibited.

The sandwiched portion 53 of the thrust foil bearings 3A and 3B has the second through holes 56 through which the fastening bolts 43 for fixing the first shim 60, the second shim 70, and the third shim 80 to the base plate 30 are inserted. According to such a configuration, the stepped member 50 may be attached to the base plate 30.

The number of second through holes 56 of the above thrust foil bearings 3A and 3B is different from the number of stepped support portions 51. With such a configuration as well, the stepped member 50 may be attached to the base plate 30.

The thrust foil bearing of the present disclosure is not limited to the above examples.

Figure 11:
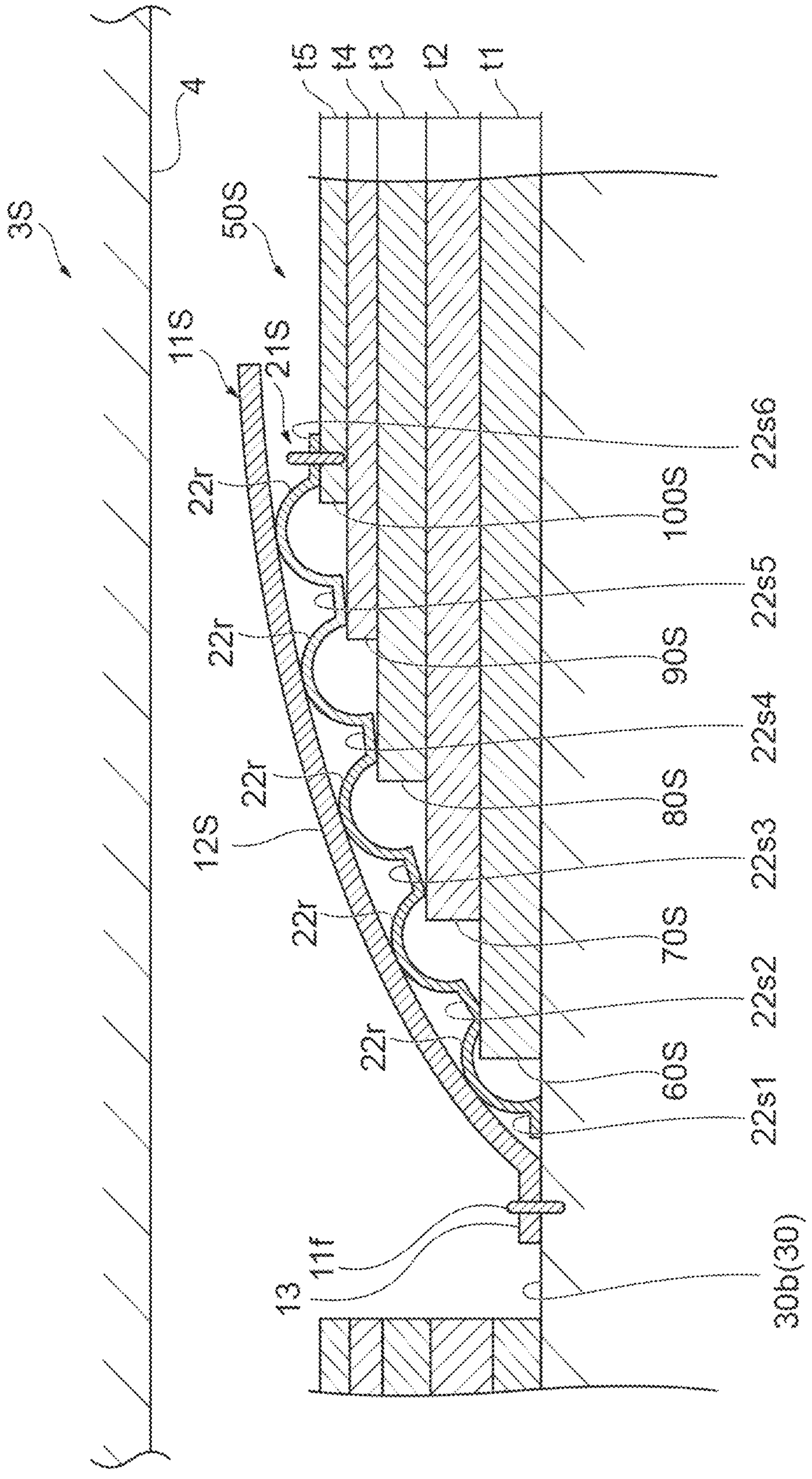
FIG. 11 is an enlarged cross-sectional view showing a main part of a thrust foil bearing of another example.

FIG. 11 is a cross-sectional view showing a main part of a thrust foil bearing 3S of another example. The thrust foil bearing 3S has a stepped member 50S. The stepped member 50S has a first shim 60S, a second shim 70S, a third shim 80S, a fourth shim 90S, and a fifth shim 100S. The bump foil piece 21S has six valley portions 22*s*. The valley portion 22*s*1 is in contact with the support surface 30*b*. The valley portion 22*s*2 is in contact with the first shim 60S. The valley portion 22*s*3 is in contact with the second shim 70S. The valley portion 22*s*4 is in contact with the third shim 80S. The valley portion 22*s*5 is in contact with the fourth shim 90S. The valley portion 22*s*6 is in contact with the fifth shim 100S. In the example described above, the thickness of the first shim 60, the thickness of the second shim 70, and the thickness of the third shim 80 are the same. In the example, a thickness of the first shim 60S, a thickness of the second shim 70S, a thickness of the third shim 80S, a thickness of the fourth shim 90S, and a thickness of the fifth shim 100S are different from each other.

The thickness of the first shim 60S is a thickness (t1). The thickness of the second shim 70S is a thickness (t2). The thickness (t1) is larger than the thickness (t2). The thickness of the third shim 80S is a thickness (t3). The thickness of the fourth shim 90S is a thickness (t4). The thickness of the fifth shim 100S is a thickness (t5). The first shim 60S is the thickest. The fifth shim 100S is the thinnest. An inclined portion 12S of a top foil piece 11S implemented by the stepped member 50S is curved. The inclined portion 12S is curved so that an inclination with respect to the support surface 30*b* gradually decreases. For example, it may be said that the inclined portion 12S is convex toward the thrust collar 4.

Figure 12:
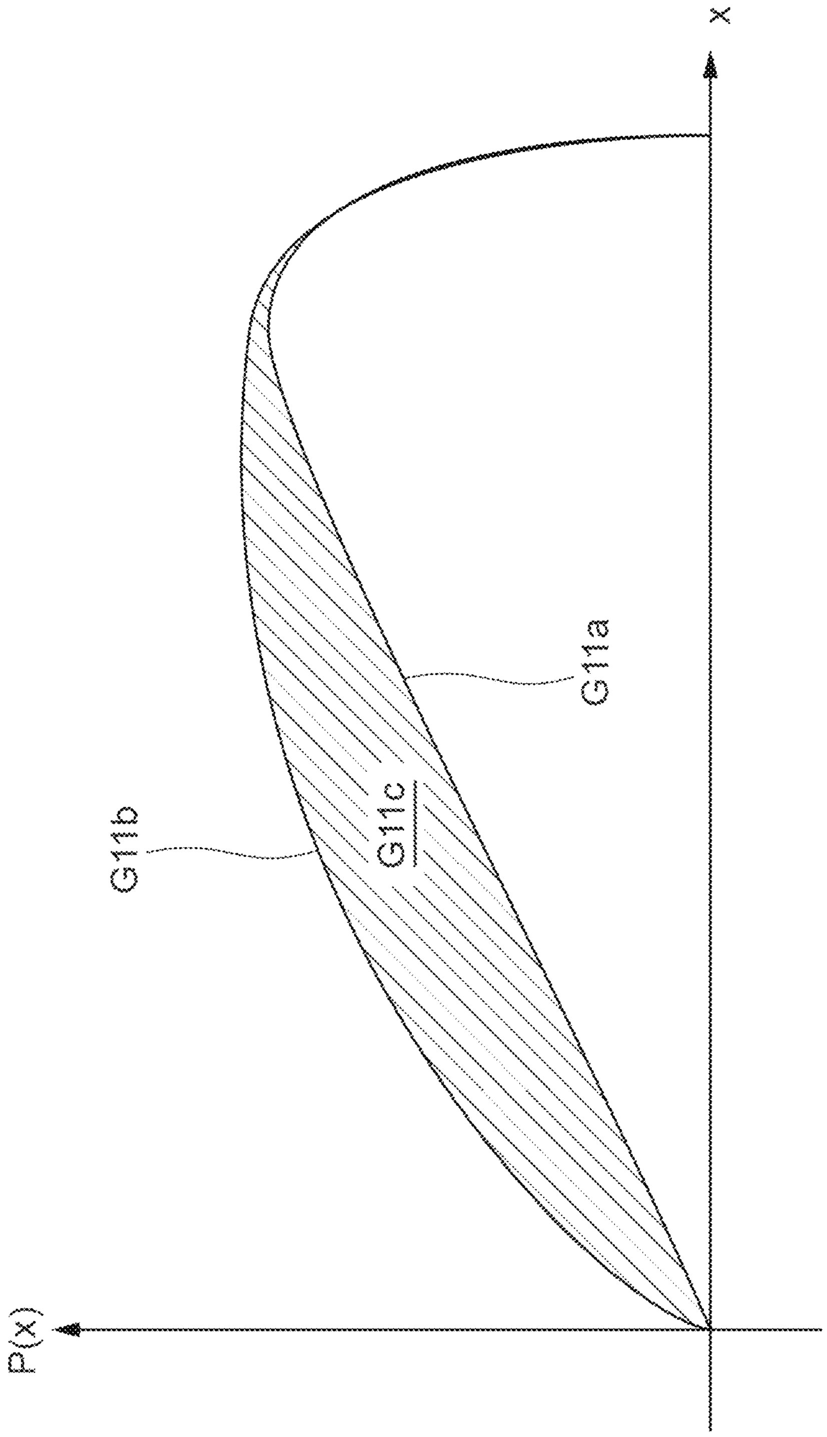
FIG. 12 is a diagram for describing actions and effects of the thrust foil bearing of another example.

FIG. 12 shows the load capacity of the thrust foil bearing 3A and a load capacity of the thrust foil bearing 3S. A horizontal axis x indicates a position in the circumferential direction. A vertical axis P (x) indicates a pressure of the fluid lubrication film. The vertical axis P (x) indicates the load capacity of the thrust foil bearings 3A and 3S. A graph G11*a* shows the load capacity of the thrust foil bearing 3A of the example. A graph G11*b* shows the load capacity of the thrust foil bearing 3S. Referring to the graphs G11*a* and G11*b*, it can be seen that the pressure of the fluid lubrication film of the thrust foil bearing 3S is higher by a hatched region G11*c*. This increase is due to the curvature of the inclined portion 12S of the top foil piece 11S.

In the thrust foil bearing 3S, the load capacity of the thrust foil bearing 3S may be improved by allowing the thicknesses of the first shim 60S, the second shim 70S, the third shim 80S, the fourth shim 90S, and the fifth shim 100S to be different from each other.

Figure 13:
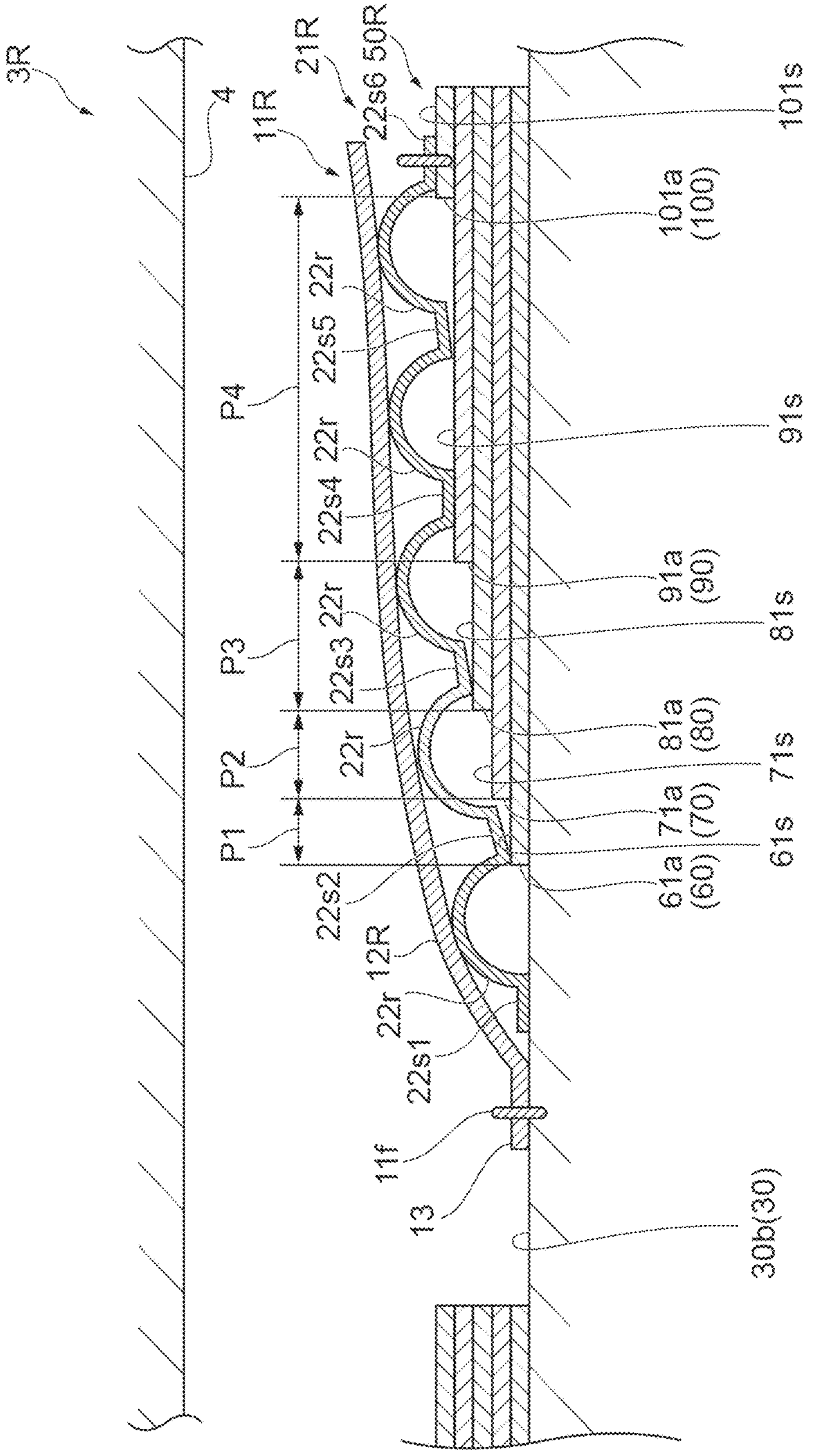
FIG. 13 is an enlarged cross-sectional view showing a main part of a thrust foil bearing of another example.

FIG. 13 is a cross-sectional view showing a main part of a thrust foil bearing 3R according to another example. In the example described above, the shift amounts P are constant. As shown in FIG. 13, in a stepped member 50R, the first shim 60, the second shim 70, the third shim 80, the fourth shim 90, and the fifth shim 100 are disposed according to mutually different shift amounts P1, P2, P3, and P4. The first shim 60, the second shim 70, the third shim 80, the fourth shim 90, and the fifth shim 100 have the same thickness, but the thicknesses of all the shims do not necessarily have to be the same.

The second stepped support front end surface 71*a* of the second shim 70 is shifted from the first stepped support front end surface 61*a* of the first shim 60 by the shift amount P1. The third stepped support front end surface 81*a* of the third shim 80 is shifted from the second stepped support front end surface 71*a* of the second shim 70 by the shift amount P2. A difference between the shift amounts P1 and P2 is a difference between an area of the first stepped surface 61*s* and an area of the second stepped surface 71*s*. Similarly, the fourth stepped support front end surface 91*a* of the fourth shim 90 is shifted from the third stepped support front end surface 81*a* of the third shim 80 by the shift amount P3. The fifth stepped support front end surface 101*a* of the fifth shim 100 is shifted from the fourth stepped support front end surface 91*a* of the fourth shim 90 by the shift amount P4.

In the stepped member 50R, the shift amount P is larger for the upper shim. For example, the area of the second stepped surface 71*s* is larger than the area of the first stepped surface 61*s*. Areas of the third stepped surface 81*s* and the fourth stepped surface 91*s* also respectively correspond to the shift amounts P3, and P4.

A bump foil piece 21R is supported by the stepped member 50R. An inclined portion 12R of a top foil piece 11R supported by the bump foil piece 21R is curved so as to be convex toward the upstream side along the rotation direction R. As a result, similarly to the example of FIG. 11, a load capacity of the thrust foil bearing 3R may be improved.

In this example, the second shim 70 does not directly support the valley portion 22*s*2 of the bump foil piece 21R. The bump foil piece 21R is not in contact with the second shim 70. Furthermore, the fourth shim 90 is in contact with the valley portion 22*s*4 and the valley portion 22*s*5. According to such a configuration, a shape of the inclined portion 12R of the top foil piece 11R may be formed into a cubic curved surface instead of a simple quadratic curved surface. In the example shown in FIG. 13, the top foil piece 11R is curved so that a downstream side of the inclined portion 12R in the rotation direction R is gradually curved upward.

Accordingly, the load capacity on the downstream side in the rotation direction R of the top foil piece 11R may be improved.

In the top foil piece 11R, directions in which the top foil piece 11R becomes convex on the upstream side and the downstream side of the inclined portion 12R are opposite to each other. As a result, a cross section of the inclined portion 12R of the top foil piece 11R has an inverted S-shape.

Figure 14:
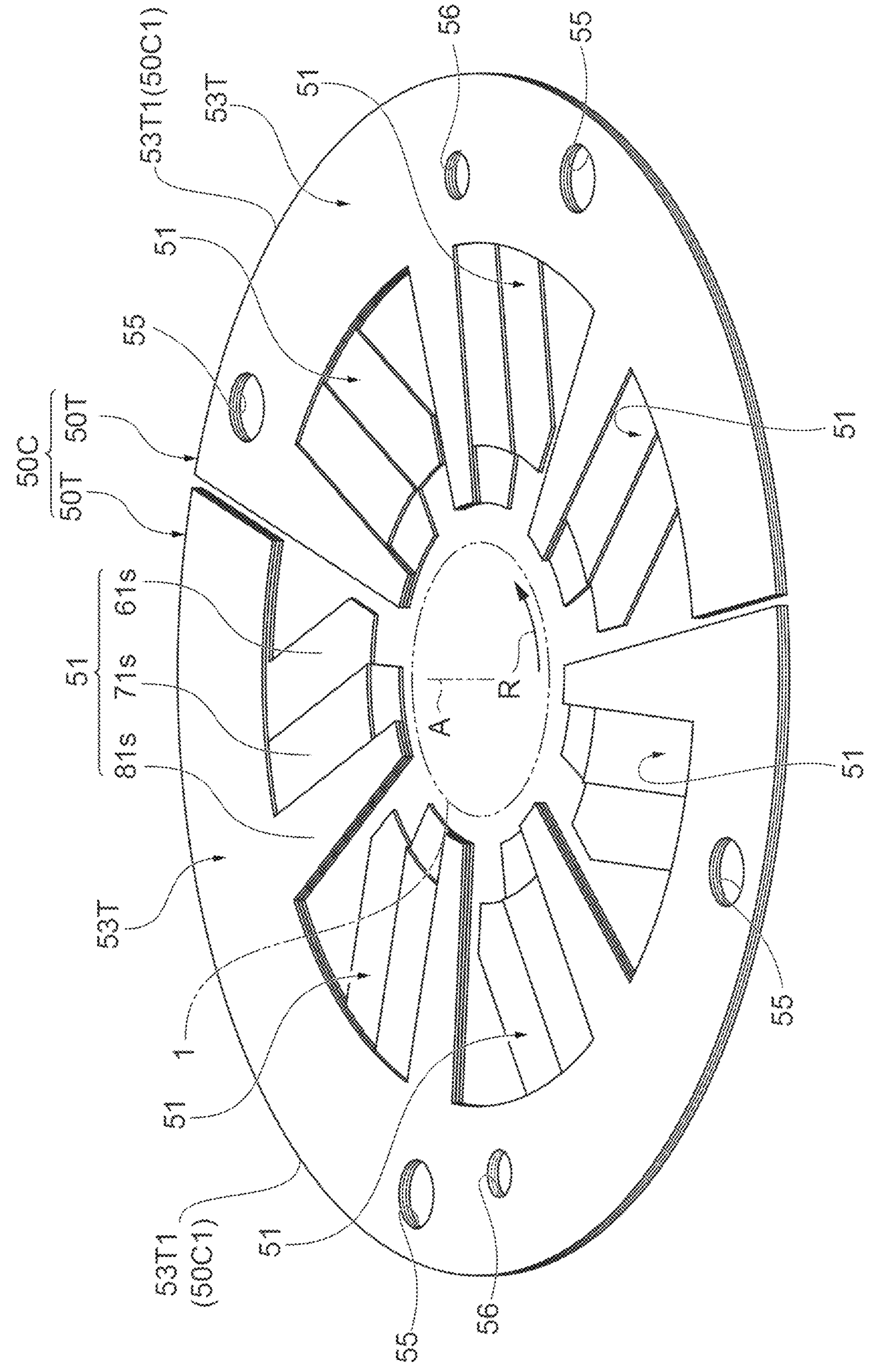
FIG. 14 is a perspective view showing a main part of a thrust foil bearing of another example.

In the above description, a configuration is illustrated in which the stepped member 50 is a single member that is annular in the plan view. The stepped member 50 is not limited to one annular member. For example, the stepped member may be formed by a plurality of stepped member pieces. The number of stepped member pieces forming the stepped member may be two. The number of stepped member pieces forming the stepped member may be an integer of two or more. FIG. 14 shows an example of a stepped member 50C formed by two stepped member pieces 50T. As shown in FIG. 14, an outer circumferential edge 50C1 of the stepped member piece 50T has an arc shape. An outer circumferential edge 53T1 of a sandwiched portion 53T included in the stepped member piece 50T is also an arc.

Figure 15:
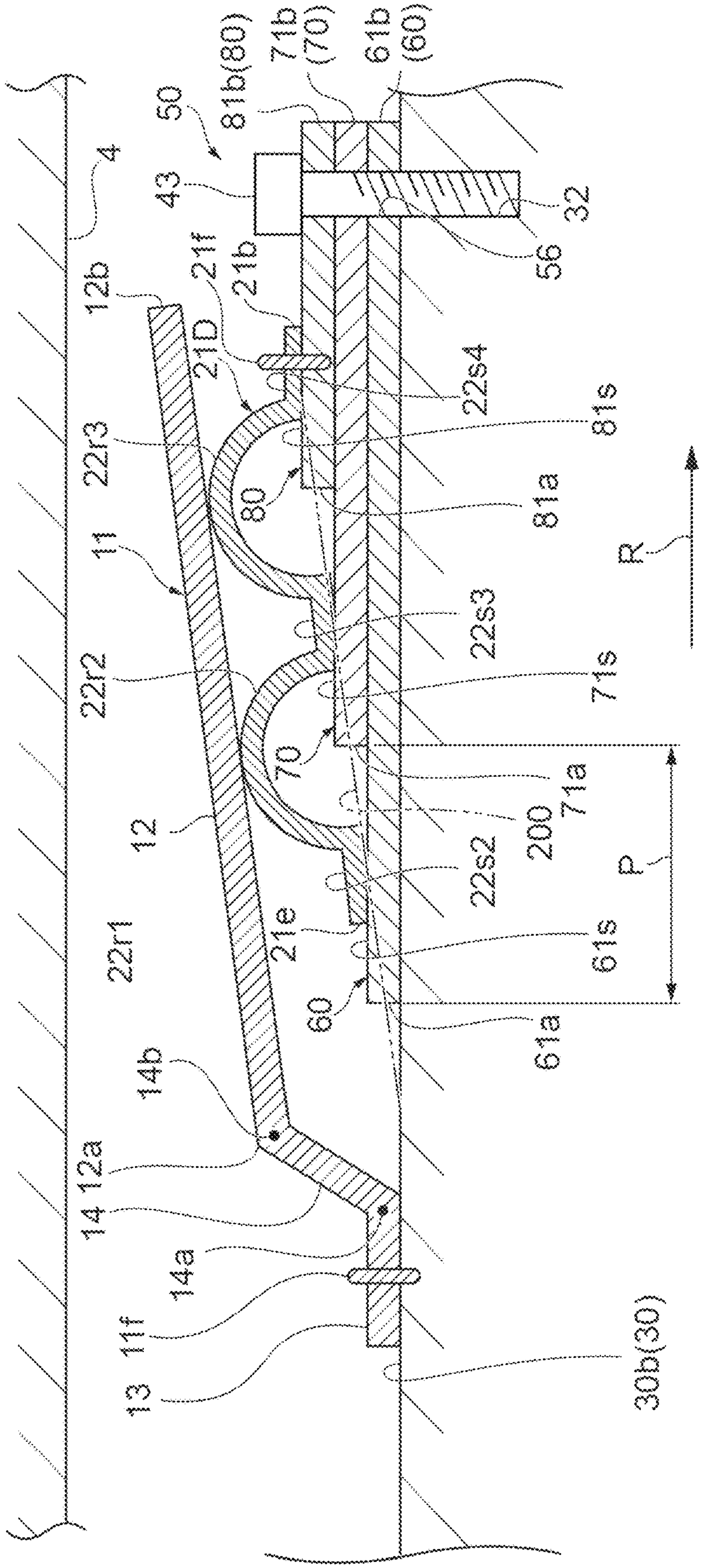
FIG. 15 is an enlarged cross-sectional view showing a main part of a thrust foil bearing of another example.

In the above description, the bump foil base end 21*e* of the bump foil piece 21 is in contact with the base plate 30. For example, as shown in FIG. 15, the bump foil base end 21*e* of the bump foil piece 21D may be disposed on the first stepped surface 61*s*. According to this configuration, the bump foil piece 21D is in contact with the stepped member 50. However, the bump foil piece 21D is not in contact with the base plate 30.

For example, the stepped member 50 may include a plurality of shims having mutually different thicknesses, and may be configured according to mutually different shift amounts P.

It is to be understood that not all aspects, advantages and features described herein may necessarily be achieved by, or included in, any one particular example. Indeed, having described and illustrated various examples herein, it should be apparent that other examples may be modified in arrangement and detail.

The invention claimed is:

1. A thrust foil bearing comprising:
- a base plate including an insertion hole through which a rotating shaft is inserted and a support surface;
- a plurality of top foil pieces;
- a stepped member that is placed on the support surface, is formed as a separate body from the base plate, and includes a plurality of stepped support portions including a plurality of stepped surfaces; and
- a plurality of bump foil pieces, wherein each bump foil piece of the plurality of bump foil pieces is disposed between each top foil piece of the plurality of top foil pieces respectively and the base plate, is disposed on each stepped support portion of the plurality of stepped support portions, and includes a contact portion in contact with a stepped surface of the plurality of stepped surfaces.

2. The thrust foil bearing according to claim 1, wherein the plurality of stepped support portions are provided so as to surround the insertion hole.

3. The thrust foil bearing according to claim 1,
- wherein the plurality of stepped surfaces includes a first stepped surface and a second stepped surface, and
- wherein a shape of the first stepped surface is different from a shape of the second stepped surface.

4. The thrust foil bearing according to claim 1,
- wherein the stepped member includes:
  - a first plate member disposed between the support surface and the top foil piece; and
  - a second plate member stacked on the first plate member.

5. The thrust foil bearing according to claim 4,
- wherein the first plate member includes:
  - a first sandwiched portion including an arc-shaped outer circumferential edge; and
  - a first support region provided between the first sandwiched portion and the insertion hole when viewed in a direction of an axis of the insertion hole,
- wherein the second plate member includes:
  - a second sandwiched portion including an arc-shaped outer circumferential edge; and
  - a second support region provided between the second sandwiched portion and the insertion hole when viewed in the direction of the axis of the insertion hole, and
- wherein the stepped support portion is formed by stacking the first support region and the second support region.

6. The thrust foil bearing according to claim 5, wherein a shape of the second support region is different from a shape of the first support region when viewed in the direction of the axis of the insertion hole.

7. The thrust foil bearing according to claim 5,
- wherein the first support region includes a first inner circumferential edge extending to surround the insertion hole,
- wherein the first inner circumferential edge includes a first inner circumferential edge portion and a second inner circumferential edge portion, and
- wherein a distance from the axis of the insertion hole to the first inner circumferential edge portion is different from a distance from the axis of the insertion hole to the second inner circumferential edge portion.

8. The thrust foil bearing according to claim 7,
- wherein the first inner circumferential edge portion has an arc shape, and
- wherein the second inner circumferential edge portion has an arc shape.

9. The thrust foil bearing according to claim 7,
- wherein the first inner circumferential edge portion is connected to the second inner circumferential edge portion by a connecting edge portion, and
- wherein the connecting edge portion is inclined with respect to a radial direction perpendicular to the axis of the insertion hole.

10. The thrust foil bearing according to claim 7,
- wherein the second support region includes a second inner circumferential edge extending to surround the insertion hole,
- wherein the second inner circumferential edge includes a third inner circumferential edge portion and a fourth inner circumferential edge portion, and
- wherein a distance from the axis of the insertion hole to the third inner circumferential edge portion is different from a distance from the axis of the insertion hole to the fourth inner circumferential edge portion.

11. The thrust foil bearing according to claim 10, wherein the distance from the axis of the insertion hole to the second inner circumferential edge portion is shorter than the distance from the axis of the insertion hole to the third inner circumferential edge portion.

12. The thrust foil bearing according to claim 10,
- wherein the second support region includes a front end surface, a rear end surface and a second a cut-out, and wherein the cut-out is located closer to the front end surface than the rear end surface.

13. The thrust foil bearing according to claim 5, wherein the first support region includes a first front end surface, a first rear end surface and a first cut-out, and wherein the first cut-out is located closer to the first front end surface than the first rear end surface.

14. The thrust foil bearing according to claim 5, wherein the first sandwiched portion and the second sandwiched portion include through holes through which a fastener fastening the stepped member to the base plate is inserted.

15. The thrust foil bearing according to claim 5, wherein the first support region includes a first front end surface and a first rear end surface, wherein the second support region includes a second front end surface and a second rear end surface, wherein a length from the second front end surface to the second rear end surface along a direction surrounding the insertion hole is shorter than a length from the first front end surface to the first rear end surface along the direction surrounding the insertion hole.

16. The thrust foil bearing according to claim 15, wherein a thickness of the first plate member is different from a thickness of the second plate member.

17. The thrust foil bearing according to claim 4, wherein the first plate member is in contact with the base plate and includes two support regions adjacent to each other in a direction surrounding the insertion hole, wherein a groove extending from a side of an outer diameter to a side of an inner diameter is formed between the two support regions, wherein the groove includes an expansion portion, and wherein a width of the expansion portion in the direction surrounding the insertion hole increases from the side of the outer diameter toward the side of the inner diameter.

18. The thrust foil bearing according to claim 4, wherein the first plate member includes an inner circumferential region, wherein the inner circumferential region includes an inner circumferential surface overlapping region that overlaps with the second plate member and an inner circumferential surface exposed region that does not overlap with the second plate member, and wherein the inner circumferential surface overlapping region and the inner circumferential surface exposed region are arranged in a direction surrounding the insertion hole.

19. The thrust foil bearing according to claim 1, wherein the stepped member includes a first plate member disposed between the support surface and the top foil piece and a second plate member stacked on the first plate member, wherein the first plate member includes a first inner circumferential edge portion and a second inner circumferential edge portion, wherein the first inner circumferential edge portion is further away from an axis of the insertion hole than the second inner circumferential edge portion, wherein the first plate member includes a first stepped inner circumferential region located between a virtual line extending from the first inner circumferential edge portion in a direction surrounding the insertion hole and the second inner circumferential edge portion, and wherein the first stepped inner circumferential region includes an inner circumferential surface overlapping region that overlaps with the second plate member and an inner circumferential surface exposed region that does not overlap with the second plate member.

20. The thrust foil bearing according to claim 19, wherein the inner circumferential surface overlapping region and the inner circumferential surface exposed region are arranged in the direction surrounding the insertion hole.

21. The thrust foil bearing according to claim 1, wherein the stepped member includes a first plate member disposed between the support surface and the top foil piece and a second plate member stacked on the first plate member, wherein the second plate member includes a distal inner circumferential edge portion and a proximal inner circumferential edge portion located closer to an axis of the insertion hole than the distal inner circumferential edge portion, wherein the first plate member includes a first stepped inner circumferential region located closer to the axis of the insertion hole than the distal inner circumferential edge portion when viewed in a direction of the axis of the insertion hole, and wherein the first stepped inner circumferential region includes an inner circumferential surface overlapping region that overlaps with the second plate member and an inner circumferential surface exposed region that does not overlap with the second plate member.

22. A thrust foil bearing comprising:

a base plate including a support surface;

a plurality of top foil pieces;

a stepped member that is placed on the support surface, is formed as a separate body from the base plate, and includes a plurality of stepped support portions and a sandwiched portion, wherein each stepped support portion of the plurality of stepped support portions includes a plurality of stepped surfaces, and wherein the sandwiched portion is provided so as to surround the plurality of stepped support portions; and a plurality of bump foil pieces, wherein each bump foil piece of the plurality of bump foil pieces is disposed between each top foil piece of the plurality of top foil pieces respectively and the base plate, is disposed on each stepped support portion of the plurality of stepped support portions, and includes a contact portion in contact with a stepped surface of the plurality of stepped surfaces.

23. The thrust foil bearing according to claim 22, wherein a shape of the sandwiched portion is annular.

* * * * *